(12) United States Patent
Shelton, IV et al.

(10) Patent No.: US 12,444,094 B2
(45) Date of Patent: Oct. 14, 2025

(54) SYSTEMS AND METHODS FOR CONTROLLING SURGICAL DATA OVERLAY

(71) Applicant: Cilag GmbH International, Zug (CH)

(72) Inventors: Frederick E. Shelton, IV, Hillsboro, OH (US); Matthew D. Cowperthwait, Cincinnati, OH (US); Kevin M. Fiebig, Cincinnati, OH (US); Shane R. Adams, Lebanon, OH (US); Cory G. Kimball, Hamilton, OH (US); Monica L. Z. Rivard, Cincinnati, OH (US); Leonardo N. Rossoni, Rahway, NJ (US); Risto Kojcev, Santa Clara, CA (US); Felix J. Bork, Schnürpflingen (DE); Brendan J. Oberkircher, Cincinnati, OH (US)

(73) Assignee: Cilag GmbH International, Zug (CH)

( * ) Notice: Subject to any disclaimer, the term of this patent is extended or adjusted under 35 U.S.C. 154(b) by 375 days.

(21) Appl. No.: 17/688,626

(22) Filed: Mar. 7, 2022

(65) Prior Publication Data

US 2022/0331049 A1 Oct. 20, 2022

Related U.S. Application Data

(60) Provisional application No. 63/284,326, filed on Nov. 30, 2021, provisional application No. 63/174,674, filed on Apr. 14, 2021.

(51) Int. Cl.
*A61B 90/00* (2016.01)
*A61B 34/00* (2016.01)
(Continued)

(52) U.S. Cl.
CPC .............. *G06T 11/00* (2013.01); *A61B 34/20* (2016.02); *A61B 34/25* (2016.02); *A61B 34/30* (2016.02);
(Continued)

(58) Field of Classification Search
CPC ......... A61B 34/20; A61B 34/25; A61B 34/30; A61B 34/76; A61B 90/36; A61B 34/32;
(Continued)

(56) References Cited

U.S. PATENT DOCUMENTS 4,171,700 A 10/1979 Farin
4,849,752 A 7/1989 Bryant
(Continued)

FOREIGN PATENT DOCUMENTS

CA 3003058 A1 5/2017
EP 0408160 A1 1/1991
(Continued)

OTHER PUBLICATIONS

"ATM-MPLS Network Interworking Version 2.0, af-aic-0178.001" ATM Standard, The ATM Forum Technical Committee, published Aug. 2003.
(Continued)

*Primary Examiner* — Jeffery A Brier
(74) *Attorney, Agent, or Firm* — Condo Roccia Koptiw LLP

(57) ABSTRACT

A surgical system is disclosed including an imaging device, a display, and a control system operably coupled to the imaging device and the display. The display is configured to show a livestream of a surgical field of a surgical procedure. The livestream is captured by the imaging device. The control system is configured to overlay, on the livestream, a first amount of information associated with the surgical procedure, detect an event configured to cause the first
(Continued)

amount of information being overlaid to increase to a second amount of information being overlaid, compare the second amount of information to a distraction threshold, adjust the second amount of information to a third amount of information based on the comparison, and overlay, on the livestream, the third amount of information based on the second amount of information being adjusted. The third amount of information is less than the distraction threshold.

20 Claims, 15 Drawing Sheets

(51) Int. Cl.
| | |
|---|---|
| A61B 34/20 | (2016.01) |
| A61B 34/30 | (2016.01) |
| A61B 34/32 | (2016.01) |
| G06F 3/14 | (2006.01) |
| G06F 3/147 | (2006.01) |
| G06T 7/00 | (2017.01) |
| G06T 7/20 | (2017.01) |
| G06T 11/00 | (2006.01) |
| G06T 19/00 | (2011.01) |
| G06V 20/20 | (2022.01) |
| G08B 21/18 | (2006.01) |
| G16H 20/40 | (2018.01) |
| G16H 40/67 | (2018.01) |
| H04L 9/40 | (2022.01) |
| H04L 67/12 | (2022.01) |
| H04W 24/10 | (2009.01) |
| H04W 76/14 | (2018.01) |
| A61B 34/10 | (2016.01) |

(52) U.S. Cl.
CPC ............ *A61B 34/32* (2016.02); *A61B 34/76* (2016.02); *A61B 90/36* (2016.02); *A61B 90/361* (2016.02); *A61B 90/37* (2016.02); *A61B 90/39* (2016.02); *G06F 3/14* (2013.01); *G06F 3/1454* (2013.01); *G06F 3/147* (2013.01); *G06T 7/0012* (2013.01); *G06T 7/20* (2013.01); *G06T 19/006* (2013.01); *G06V 20/20* (2022.01); *G08B 21/182* (2013.01); *G16H 20/40* (2018.01); *G16H 40/67* (2018.01); *H04L 63/105* (2013.01); *H04L 67/12* (2013.01); *H04W 24/10* (2013.01); *H04W 76/14* (2018.02); *A61B 2034/102* (2016.02); *A61B 2034/2055* (2016.02); *A61B 2034/2072* (2016.02); *A61B 2090/365* (2016.02); *A61B 2090/368* (2016.02); *A61B 2090/371* (2016.02); *A61B 2090/372* (2016.02); *A61B 2090/373* (2016.02); *A61B 2090/3937* (2016.02); *A61B 2090/3975* (2016.02); *G06T 2207/10028* (2013.01); *G06T 2207/30024* (2013.01); *G06T 2210/41* (2013.01)

(58) Field of Classification Search
CPC ....... A61B 90/361; A61B 90/37; A61B 90/39; A61B 2034/102; A61B 2034/2055; A61B 2034/2072; A61B 2090/368; A61B 2090/371; A61B 2090/372; A61B 2090/373; A61B 2090/3975; G06T 11/00; G06T 7/0012; G06T 7/20; G06T 19/006; G06T 2207/10028; G06T 2207/30024; G06F 3/14; G06F 3/1454; G06F 3/147; G06V 20/20; G16H 20/40; G16H 40/67; H04W 24/10; H04W 76/14

See application file for complete search history.

(56) References Cited

U.S. PATENT DOCUMENTS

| | | |
|---|---|---|
| D303,787 S | 10/1989 | Messenger et al. |
| D327,061 S | 6/1992 | Soren et al. |
| 5,189,277 A | 2/1993 | Boisvert et al. |
| 5,204,669 A | 4/1993 | Dorfe et al. |
| 5,318,563 A | 6/1994 | Malis et al. |
| 5,325,270 A | 6/1994 | Wenger et al. |
| 5,425,375 A | 6/1995 | Chin et al. |
| D379,346 S | 5/1997 | Mieki |
| 5,690,504 A | 11/1997 | Scanlan et al. |
| 5,693,042 A | 12/1997 | Boiarski et al. |
| 5,724,468 A | 3/1998 | Leone et al. |
| 6,049,467 A | 4/2000 | Tamarkin et al. |
| 6,055,458 A | 4/2000 | Cochran et al. |
| D431,811 S | 10/2000 | Nishio et al. |
| 6,179,136 B1 | 1/2001 | Kluge et al. |
| 6,269,411 B1 | 7/2001 | Reasoner |
| 6,288,606 B1 | 9/2001 | Ekman et al. |
| 6,416,471 B1 | 7/2002 | Kumar et al. |
| 6,501,485 B1 | 12/2002 | Dash et al. |
| 6,546,270 B1 | 4/2003 | Goldin et al. |
| 6,584,358 B2 | 6/2003 | Carter et al. |
| 6,611,793 B1 | 8/2003 | Burnside et al. |
| 6,731,514 B2 | 5/2004 | Evans |
| 6,760,218 B2 | 7/2004 | Fan |
| 6,839,238 B2 | 1/2005 | Derr et al. |
| 6,843,657 B2 | 1/2005 | Driscoll et al. |
| 6,913,471 B2 | 7/2005 | Smith |
| 7,009,511 B2 | 3/2006 | Mazar et al. |
| 7,044,949 B2 | 5/2006 | Orszulak et al. |
| 7,074,205 B1 | 7/2006 | Duffy et al. |
| 7,134,994 B2 | 11/2006 | Alpert et al. |
| 7,171,784 B2 | 2/2007 | Eenigenburg |
| 7,217,269 B2 | 5/2007 | El-Galley et al. |
| 7,252,664 B2 | 8/2007 | Nasab et al. |
| 7,331,699 B2 | 2/2008 | Gawalkiewicz et al. |
| 7,344,532 B2 | 3/2008 | Goble et al. |
| 7,353,068 B2 | 4/2008 | Tanaka et al. |
| 7,408,439 B2 | 8/2008 | Wang et al. |
| D579,876 S | 11/2008 | Novotney et al. |
| D583,328 S | 12/2008 | Chiang |
| 7,496,418 B2 | 2/2009 | Kim et al. |
| D589,447 S | 3/2009 | Sasada et al. |
| 7,500,747 B2 | 3/2009 | Howell et al. |
| 7,518,502 B2 | 4/2009 | Austin et al. |
| 7,563,259 B2 | 7/2009 | Takahashi |
| 7,601,149 B2 | 10/2009 | DiCarlo et al. |
| 7,637,907 B2 | 12/2009 | Blaha |
| 7,656,671 B2 | 2/2010 | Liu et al. |
| 7,757,028 B2 | 7/2010 | Druke et al. |
| D631,252 S | 1/2011 | Leslie |
| 7,932,826 B2 | 4/2011 | Fritchie et al. |
| 7,945,065 B2 | 5/2011 | Menzl et al. |
| 7,945,342 B2 | 5/2011 | Tsai et al. |
| 7,982,776 B2 | 7/2011 | Dunki-Jacobs et al. |
| 7,995,045 B2 | 8/2011 | Dunki-Jacobs |
| 8,019,094 B2 | 9/2011 | Hsieh et al. |
| 8,086,008 B2 | 12/2011 | Coste-Maniere et al. |
| D655,678 S | 3/2012 | Kobayashi et al. |
| D657,368 S | 4/2012 | Magee et al. |
| 8,239,066 B2 | 8/2012 | Jennings et al. |
| D667,838 S | 9/2012 | Magee et al. |
| D675,164 S | 1/2013 | Kobayashi et al. |
| D676,392 S | 2/2013 | Gassauer |
| D678,196 S | 3/2013 | Miyauchi et al. |
| D678,304 S | 3/2013 | Yakoub et al. |
| 8,423,182 B2 | 4/2013 | Robinson et al. |
| D687,146 S | 7/2013 | Juzkiw et al. |
| 8,504,136 B1 | 8/2013 | Sun et al. |
| 8,540,709 B2 | 9/2013 | Allen |
| 8,567,393 B2 | 10/2013 | Hickle et al. |

(56) References Cited

U.S. PATENT DOCUMENTS

| | | |
|---|---|---|
| D704,839 S | 5/2014 | Juzkiw et al. |
| 8,795,001 B1 | 8/2014 | Lam et al. |
| 8,819,581 B2 | 8/2014 | Nakamura et al. |
| D716,333 S | 10/2014 | Chotin et al. |
| 8,917,513 B1 | 12/2014 | Hazzard |
| 8,920,186 B2 | 12/2014 | Shishikura |
| 8,923,012 B2 | 12/2014 | Kaufman et al. |
| 8,968,296 B2 | 3/2015 | McPherson |
| 8,986,288 B2 | 3/2015 | Konishi |
| 9,017,326 B2 | 4/2015 | Dinardo et al. |
| D729,267 S | 5/2015 | Yoo et al. |
| 9,055,870 B2 | 6/2015 | Meador et al. |
| 9,065,394 B2 | 6/2015 | Lim et al. |
| 9,129,054 B2 | 9/2015 | Nawana et al. |
| 9,160,853 B1 | 10/2015 | Daddi et al. |
| 9,168,054 B2 | 10/2015 | Turner et al. |
| 9,168,091 B2 | 10/2015 | Janssen et al. |
| 9,198,711 B2 | 12/2015 | Joseph |
| 9,226,766 B2 | 1/2016 | Aldridge et al. |
| 9,226,791 B2 | 1/2016 | McCarthy et al. |
| 9,237,921 B2 | 1/2016 | Messerly et al. |
| 9,265,429 B2 | 2/2016 | St. Pierre et al. |
| 9,277,961 B2 | 3/2016 | Panescu et al. |
| 9,277,969 B2 | 3/2016 | Brannan et al. |
| 9,281,615 B1 | 3/2016 | Plaza et al. |
| 9,320,646 B2 | 4/2016 | Todd et al. |
| 9,345,481 B2 | 5/2016 | Hall et al. |
| 9,345,900 B2 | 5/2016 | Wu et al. |
| 9,351,653 B1 | 5/2016 | Harrison |
| 9,427,255 B2 | 8/2016 | Griffith et al. |
| 9,463,646 B2 | 10/2016 | Payne et al. |
| 9,474,565 B2 | 10/2016 | Shikhman et al. |
| D772,252 S | 11/2016 | Myers et al. |
| 9,486,271 B2 | 11/2016 | Dunning |
| 9,491,895 B2 | 11/2016 | Steeves et al. |
| 9,503,681 B1 | 11/2016 | Popescu et al. |
| 9,532,827 B2 | 1/2017 | Morgan et al. |
| 9,600,031 B2 | 3/2017 | Kaneko et al. |
| 9,603,277 B2 | 3/2017 | Morgan et al. |
| D783,675 S | 4/2017 | Yagisawa et al. |
| D784,270 S | 4/2017 | Bhattacharya |
| 9,666,974 B2 | 5/2017 | Bopp |
| 9,713,503 B2 | 7/2017 | Goldschmidt |
| 9,715,271 B2 | 7/2017 | Kaestner |
| 9,750,563 B2 | 9/2017 | Shikhman et al. |
| 9,770,103 B2 | 9/2017 | Cochran et al. |
| 9,773,093 B2 | 9/2017 | Bernini et al. |
| 9,782,214 B2 | 10/2017 | Houser et al. |
| 9,788,907 B1 * | 10/2017 | Alvi ................ G11B 27/34 |
| 9,804,977 B2 | 10/2017 | Ghosh et al. |
| 9,867,670 B2 | 1/2018 | Brannan et al. |
| 9,892,564 B1 | 2/2018 | Cvetko et al. |
| 9,907,196 B2 | 2/2018 | Susini et al. |
| 9,935,794 B1 | 4/2018 | Cao et al. |
| 9,971,395 B2 | 5/2018 | Chenault et al. |
| 9,974,595 B2 | 5/2018 | Anderson et al. |
| 9,987,068 B2 | 6/2018 | Anderson et al. |
| 9,987,072 B2 | 6/2018 | McPherson |
| 10,028,402 B1 | 7/2018 | Walker |
| 10,039,589 B2 | 8/2018 | Virshek et al. |
| D832,211 S | 10/2018 | Ladd et al. |
| 10,098,527 B2 | 10/2018 | Weisenburgh, II et al. |
| 10,105,470 B2 | 10/2018 | Reasoner et al. |
| 10,109,835 B2 | 10/2018 | Yang |
| D834,541 S | 11/2018 | You et al. |
| 10,117,702 B2 | 11/2018 | Danziger et al. |
| 10,128,612 B1 | 11/2018 | Casto |
| 10,136,954 B2 | 11/2018 | Johnson et al. |
| 10,137,245 B2 | 11/2018 | Melker et al. |
| 10,147,148 B2 | 12/2018 | Wu et al. |
| 10,166,019 B2 | 1/2019 | Nawana et al. |
| 10,166,061 B2 | 1/2019 | Berry et al. |
| 10,170,205 B2 | 1/2019 | Curd et al. |
| 10,201,365 B2 | 2/2019 | Boudreaux et al. |
| 10,339,496 B2 | 7/2019 | Matson et al. |
| 10,357,184 B2 | 7/2019 | Crawford et al. |
| 10,386,990 B2 | 8/2019 | Shikhman et al. |
| 10,441,345 B2 | 10/2019 | Aldridge et al. |
| 10,449,004 B2 | 10/2019 | Ferro et al. |
| 10,475,244 B2 | 11/2019 | Cvetko et al. |
| 10,493,287 B2 | 12/2019 | Yoder et al. |
| 10,499,847 B2 | 12/2019 | Latimer et al. |
| 10,499,996 B2 | 12/2019 | de Almeida Barreto |
| 10,523,122 B2 | 12/2019 | Han et al. |
| 10,531,579 B2 | 1/2020 | Hsiao et al. |
| D876,466 S | 2/2020 | Kobayashi et al. |
| 10,561,753 B2 | 2/2020 | Thompson et al. |
| 10,602,007 B2 | 3/2020 | Takano |
| 10,610,310 B2 | 4/2020 | Todd et al. |
| 10,624,667 B2 | 4/2020 | Faller et al. |
| 10,624,691 B2 | 4/2020 | Wiener et al. |
| 10,675,100 B2 | 6/2020 | Frushour |
| 10,687,884 B2 | 6/2020 | Wiener et al. |
| 10,729,502 B1 | 8/2020 | Wolf et al. |
| 10,743,872 B2 | 8/2020 | Leimbach et al. |
| 10,758,309 B2 | 9/2020 | Chow et al. |
| 10,758,310 B2 | 9/2020 | Shelton, IV et al. |
| 10,772,673 B2 | 9/2020 | Allen, IV et al. |
| 10,878,966 B2 | 12/2020 | Wolf et al. |
| 10,881,399 B2 | 1/2021 | Shelton, IV et al. |
| 10,898,256 B2 | 1/2021 | Yates et al. |
| 10,925,598 B2 | 2/2021 | Scheib et al. |
| 10,932,705 B2 | 3/2021 | Muhsin et al. |
| 10,932,772 B2 | 3/2021 | Shelton, IV et al. |
| 10,950,982 B2 | 3/2021 | Regnier et al. |
| 10,987,176 B2 | 4/2021 | Poltaretskyi et al. |
| 10,989,724 B1 | 4/2021 | Holmes et al. |
| 11,000,270 B2 | 5/2021 | Scheib et al. |
| 11,006,100 B1 | 5/2021 | Douglas |
| D924,139 S | 7/2021 | Jayme |
| 11,056,244 B2 | 7/2021 | Shelton, IV et al. |
| 11,065,079 B2 | 7/2021 | Wolf et al. |
| 11,071,595 B2 | 7/2021 | Johnson et al. |
| D928,725 S | 8/2021 | Oberkircher et al. |
| D928,726 S | 8/2021 | Asher et al. |
| 11,083,489 B2 | 8/2021 | Fujii et al. |
| 11,114,199 B2 | 9/2021 | Moctezuma De La Barrera |
| 11,116,587 B2 | 9/2021 | Wolf et al. |
| D939,545 S | 12/2021 | Oberkircher et al. |
| 11,218,822 B2 | 1/2022 | Morgan et al. |
| 11,259,793 B2 | 3/2022 | Scheib et al. |
| 11,259,875 B2 | 3/2022 | Boutin et al. |
| 11,272,839 B2 | 3/2022 | Al-Ali et al. |
| 11,284,963 B2 | 3/2022 | Shelton, IV et al. |
| 11,296,540 B2 | 4/2022 | Kirleis et al. |
| 11,298,128 B2 | 4/2022 | Messerly et al. |
| 11,304,763 B2 | 4/2022 | Shelton, IV et al. |
| 11,314,846 B1 | 4/2022 | Colin et al. |
| 11,350,978 B2 | 6/2022 | Henderson et al. |
| 11,369,366 B2 | 6/2022 | Scheib et al. |
| 11,382,699 B2 | 7/2022 | Wassall et al. |
| 11,382,700 B2 | 7/2022 | Calloway et al. |
| 11,419,604 B2 | 8/2022 | Scheib et al. |
| 11,424,027 B2 | 8/2022 | Shelton, IV |
| 11,432,877 B2 | 9/2022 | Nash et al. |
| 11,464,581 B2 | 10/2022 | Calloway |
| 11,471,206 B2 | 10/2022 | Henderson et al. |
| 11,478,820 B2 | 10/2022 | Bales, Jr. et al. |
| 11,504,192 B2 | 11/2022 | Shelton, IV et al. |
| 11,510,720 B2 | 11/2022 | Morgan et al. |
| 11,510,750 B2 | 11/2022 | Dulin et al. |
| 2001/0029315 A1 | 10/2001 | Sakurai et al. |
| 2003/0078631 A1 | 4/2003 | Nelson et al. |
| 2003/0199794 A1 | 10/2003 | Sakurai et al. |
| 2003/0199864 A1 | 10/2003 | Eick |
| 2004/0030328 A1 | 2/2004 | Eggers et al. |
| 2004/0059323 A1 | 3/2004 | Sturm et al. |
| 2004/0111045 A1 | 6/2004 | Sullivan et al. |
| 2004/0164983 A1 | 8/2004 | Khozai |
| 2005/0010209 A1 | 1/2005 | Lee et al. |
| 2005/0013459 A1 | 1/2005 | Maekawa |
| 2005/0113823 A1 | 5/2005 | Reschke et al. |
| 2005/0165390 A1 | 7/2005 | Mauti et al. |
| 2005/0229110 A1 | 10/2005 | Gegner et al. |

(56) References Cited

U.S. PATENT DOCUMENTS

| | | |
|---|---|---|
| 2005/0251233 A1 | 11/2005 | Kanzius |
| 2006/0082542 A1 | 4/2006 | Morita et al. |
| 2006/0085049 A1 | 4/2006 | Cory et al. |
| 2006/0136622 A1 | 6/2006 | Rouvelin et al. |
| 2006/0149418 A1 | 7/2006 | Anvari |
| 2006/0256516 A1 | 11/2006 | Cho |
| 2007/0076363 A1 | 4/2007 | Liang et al. |
| 2007/0211930 A1 | 9/2007 | Dolwick et al. |
| 2007/0282321 A1 | 12/2007 | Shah et al. |
| 2008/0072896 A1 | 3/2008 | Setzer et al. |
| 2008/0129465 A1 | 6/2008 | Rao |
| 2008/0249377 A1 | 10/2008 | Molducci et al. |
| 2008/0316304 A1 | 12/2008 | Claus et al. |
| 2009/0036884 A1 | 2/2009 | Gregg et al. |
| 2009/0131929 A1 | 5/2009 | Shimizu |
| 2009/0192524 A1 | 7/2009 | Itkowitz et al. |
| 2009/0216091 A1 | 8/2009 | Arndt |
| 2009/0234352 A1 | 9/2009 | Behnke et al. |
| 2010/0036405 A1 | 2/2010 | Giordano et al. |
| 2010/0042010 A1 | 2/2010 | Ronald et al. |
| 2010/0053213 A1 | 3/2010 | Hironobu et al. |
| 2010/0069939 A1 | 3/2010 | Konishi |
| 2010/0076453 A1 | 3/2010 | Morris et al. |
| 2010/0092006 A1 | 4/2010 | Rosen |
| 2010/0120266 A1 | 5/2010 | Rimborg |
| 2010/0198200 A1 | 8/2010 | Horvath |
| 2010/0312239 A1 | 12/2010 | Sclig |
| 2011/0118748 A1 | 5/2011 | Itkowitz |
| 2011/0125149 A1 | 5/2011 | El-Galley et al. |
| 2011/0130689 A1 | 6/2011 | Cohen et al. |
| 2011/0190588 A1 | 8/2011 | Mckay |
| 2011/0245630 A1 | 10/2011 | St. Pierre et al. |
| 2011/0273465 A1 | 11/2011 | Konishi et al. |
| 2011/0298814 A1 | 12/2011 | Mathew et al. |
| 2011/0306840 A1 | 12/2011 | Allen et al. |
| 2012/0029304 A1 | 2/2012 | Medina et al. |
| 2012/0082036 A1 | 4/2012 | Saied et al. |
| 2012/0116380 A1 | 5/2012 | Madan et al. |
| 2012/0132661 A1 | 5/2012 | Gu et al. |
| 2013/0031201 A1 | 1/2013 | Kagan et al. |
| 2013/0038707 A1 | 2/2013 | Cunningham et al. |
| 2013/0176220 A1 | 7/2013 | Merschon et al. |
| 2013/0197357 A1 | 8/2013 | Green et al. |
| 2013/0197503 A1 | 8/2013 | Orszulak |
| 2013/0267975 A1 | 10/2013 | Timm et al. |
| 2013/0268283 A1 | 10/2013 | Vann et al. |
| 2013/0303851 A1 | 11/2013 | Griffith et al. |
| 2013/0321159 A1 | 12/2013 | Schofield et al. |
| 2014/0009894 A1 | 1/2014 | Yu |
| 2014/0052150 A1 | 2/2014 | Russell et al. |
| 2014/0058714 A1 | 2/2014 | Boyer |
| 2014/0087573 A1 | 3/2014 | Kroeckel |
| 2014/0155721 A1 | 6/2014 | Hauck et al. |
| 2014/0194683 A1 | 7/2014 | Nakaguchi |
| 2014/0221740 A1 | 8/2014 | Kawula et al. |
| 2014/0226572 A1 | 8/2014 | Thota et al. |
| 2014/0262598 A1 | 9/2014 | Miki et al. |
| 2014/0263552 A1 | 9/2014 | Hall et al. |
| 2014/0343358 A1 | 11/2014 | Hameed et al. |
| 2015/0019259 A1 | 1/2015 | Qureshi et al. |
| 2015/0070388 A1* | 3/2015 | Sheaffer ............ G02B 27/017 345/633 |
| 2015/0190189 A1 | 7/2015 | Yates et al. |
| 2015/0272575 A1 | 10/2015 | Leimbach et al. |
| 2015/0289929 A1 | 10/2015 | Toth et al. |
| 2016/0045247 A1 | 2/2016 | Heim et al. |
| 2016/0058286 A1 | 3/2016 | Joshua et al. |
| 2016/0066184 A1 | 3/2016 | Bhargav-Spantzel et al. |
| 2016/0074096 A1 | 3/2016 | Lieu |
| 2016/0120591 A1 | 5/2016 | Smith et al. |
| 2016/0225192 A1 | 8/2016 | Jones et al. |
| 2016/0287312 A1 | 10/2016 | Tegg et al. |
| 2016/0287337 A1 | 10/2016 | Aram et al. |
| 2017/0000553 A1 | 1/2017 | Wiener et al. |
| 2017/0090507 A1 | 3/2017 | Wiener et al. |
| 2017/0189096 A1 | 7/2017 | Danziger et al. |
| 2017/0202595 A1 | 7/2017 | Shelton, IV |
| 2017/0209225 A1 | 7/2017 | Wu |
| 2017/0251305 A1 | 8/2017 | Fathollahi |
| 2017/0252091 A1 | 9/2017 | Honda |
| 2017/0258526 A1 | 9/2017 | Lang |
| 2017/0296036 A1 | 10/2017 | Newman |
| 2017/0296213 A1 | 10/2017 | Swensgard et al. |
| 2017/0319259 A1 | 11/2017 | Dunning |
| 2017/0333275 A1 | 11/2017 | Itkowitz et al. |
| 2017/0360466 A1 | 12/2017 | Brown et al. |
| 2017/0367766 A1 | 12/2017 | Mahfouz |
| 2018/0014872 A1 | 1/2018 | Dickerson |
| 2018/0032130 A1 | 2/2018 | Meglan |
| 2018/0042659 A1 | 2/2018 | Rupp et al. |
| 2018/0043037 A1 | 2/2018 | Dalma-weiszhausz et al. |
| 2018/0049795 A1 | 2/2018 | Swayze et al. |
| 2018/0065248 A1 | 3/2018 | Barral et al. |
| 2018/0078216 A1 | 3/2018 | Baker et al. |
| 2018/0082480 A1 | 3/2018 | White et al. |
| 2018/0092699 A1 | 4/2018 | Finley |
| 2018/0099161 A1 | 4/2018 | Honda |
| 2018/0173323 A1 | 6/2018 | Harvey et al. |
| 2018/0221005 A1 | 8/2018 | Hamel et al. |
| 2018/0228528 A1 | 8/2018 | Fraasch et al. |
| 2018/0235441 A1 | 8/2018 | Huang et al. |
| 2018/0243573 A1 | 8/2018 | Yoder et al. |
| 2018/0262916 A1 | 9/2018 | Polley et al. |
| 2018/0263557 A1 | 9/2018 | Kahlman |
| 2018/0289338 A1 | 10/2018 | Meador et al. |
| 2018/0317826 A1 | 11/2018 | Muhsin et al. |
| 2018/0333207 A1 | 11/2018 | Moctezuma De La Barrera |
| 2018/0368930 A1 | 12/2018 | Esterberg et al. |
| 2019/0035153 A1 | 1/2019 | Dange |
| 2019/0038362 A1 | 2/2019 | Nash et al. |
| 2019/0069957 A1 | 3/2019 | Barral et al. |
| 2019/0104919 A1* | 4/2019 | Shelton, IV ........... A61B 18/00 |
| 2019/0125361 A1 | 5/2019 | Shelton, IV et al. |
| 2019/0125451 A1 | 5/2019 | Srimohanarajah et al. |
| 2019/0125454 A1 | 5/2019 | Stokes et al. |
| 2019/0125455 A1 | 5/2019 | Shelton, IV et al. |
| 2019/0125459 A1 | 5/2019 | Shelton et al. |
| 2019/0183576 A1 | 6/2019 | Fahim et al. |
| 2019/0183591 A1 | 6/2019 | Johnson et al. |
| 2019/0200844 A1 | 7/2019 | Shelton, IV et al. |
| 2019/0200906 A1 | 7/2019 | Shelton, IV et al. |
| 2019/0200981 A1 | 7/2019 | Harris et al. |
| 2019/0200987 A1 | 7/2019 | Shelton, IV et al. |
| 2019/0201046 A1 | 7/2019 | Shelton, IV et al. |
| 2019/0201102 A1 | 7/2019 | Shelton, IV et al. |
| 2019/0201114 A1 | 7/2019 | Shelton, IV et al. |
| 2019/0201116 A1* | 7/2019 | Shelton, IV ........... G16H 30/40 |
| 2019/0201117 A1 | 7/2019 | Yates et al. |
| 2019/0201127 A1 | 7/2019 | Shelton, IV et al. |
| 2019/0201136 A1 | 7/2019 | Shelton, IV et al. |
| 2019/0201137 A1 | 7/2019 | Shelton, IV et al. |
| 2019/0201140 A1 | 7/2019 | Yates et al. |
| 2019/0201158 A1 | 7/2019 | Shelton, IV et al. |
| 2019/0205001 A1 | 7/2019 | Messerly et al. |
| 2019/0206004 A1 | 7/2019 | Shelton, IV et al. |
| 2019/0206562 A1 | 7/2019 | Shelton, IV et al. |
| 2019/0206563 A1 | 7/2019 | Shelton, IV et al. |
| 2019/0206565 A1 | 7/2019 | Shelton, IV |
| 2019/0206569 A1 | 7/2019 | Shelton, IV et al. |
| 2019/0224434 A1 | 7/2019 | Silver et al. |
| 2019/0236840 A1 | 8/2019 | Zuckerman et al. |
| 2019/0247141 A1 | 8/2019 | Batchelor et al. |
| 2019/0278262 A1 | 9/2019 | Taylor et al. |
| 2019/0279524 A1 | 9/2019 | Stoyanov et al. |
| 2019/0290297 A1 | 9/2019 | Haider |
| 2019/0348169 A1 | 11/2019 | Gibby et al. |
| 2019/0371012 A1 | 12/2019 | Flexman et al. |
| 2020/0004487 A1 | 1/2020 | Hanajima et al. |
| 2020/0015895 A1 | 1/2020 | Frielinghaus et al. |
| 2020/0015898 A1 | 1/2020 | Scheib et al. |
| 2020/0015899 A1 | 1/2020 | Scheib et al. |
| 2020/0015900 A1 | 1/2020 | Scheib et al. |
| 2020/0015902 A1 | 1/2020 | Scheib et al. |
| 2020/0015906 A1 | 1/2020 | Scheib et al. |

(56) References Cited

U.S. PATENT DOCUMENTS

| | | |
|---|---|---|
| 2020/0015907 A1 | 1/2020 | Scheib |
| 2020/0015914 A1 | 1/2020 | Scheib et al. |
| 2020/0015924 A1 | 1/2020 | Scheib et al. |
| 2020/0038120 A1 | 2/2020 | Ziraknejad et al. |
| 2020/0078070 A1 | 3/2020 | Henderson et al. |
| 2020/0078071 A1 | 3/2020 | Asher |
| 2020/0078076 A1 | 3/2020 | Henderson et al. |
| 2020/0078078 A1 | 3/2020 | Henderson et al. |
| 2020/0078080 A1 | 3/2020 | Henderson et al. |
| 2020/0078081 A1 | 3/2020 | Jayme et al. |
| 2020/0078082 A1 | 3/2020 | Henderson et al. |
| 2020/0078083 A1 | 3/2020 | Sprinkle et al. |
| 2020/0078089 A1 | 3/2020 | Henderson et al. |
| 2020/0078110 A1 | 3/2020 | Henderson et al. |
| 2020/0078111 A1 | 3/2020 | Oberkircher et al. |
| 2020/0078112 A1 | 3/2020 | Henderson et al. |
| 2020/0078113 A1 | 3/2020 | Sawhney et al. |
| 2020/0078114 A1 | 3/2020 | Asher et al. |
| 2020/0078115 A1 | 3/2020 | Asher et al. |
| 2020/0078116 A1 | 3/2020 | Oberkircher et al. |
| 2020/0078117 A1 | 3/2020 | Henderson et al. |
| 2020/0078118 A1 | 3/2020 | Henderson et al. |
| 2020/0078119 A1 | 3/2020 | Henderson et al. |
| 2020/0078120 A1 | 3/2020 | Aldridge et al. |
| 2020/0081585 A1 | 3/2020 | Petre et al. |
| 2020/0090808 A1 | 3/2020 | Carroll et al. |
| 2020/0093357 A1 | 3/2020 | Scott et al. |
| 2020/0100825 A1 | 4/2020 | Henderson et al. |
| 2020/0100830 A1 | 4/2020 | Henderson et al. |
| 2020/0106220 A1 | 4/2020 | Henderson et al. |
| 2020/0159313 A1 | 5/2020 | Gibby et al. |
| 2020/0237031 A1 | 7/2020 | Daniels et al. |
| 2020/0237452 A1 | 7/2020 | Wolf et al. |
| 2020/0268469 A1 | 8/2020 | Wolf et al. |
| 2020/0268472 A1 | 8/2020 | Wolf et al. |
| 2020/0305924 A1 | 10/2020 | Carroll |
| 2020/0305945 A1 | 10/2020 | Morgan et al. |
| 2020/0315707 A1 | 10/2020 | Venkataranan |
| 2020/0322516 A1 | 10/2020 | Doser et al. |
| 2020/0342228 A1 | 10/2020 | Prevrhal et al. |
| 2020/0359892 A1 | 11/2020 | Rollins et al. |
| 2020/0384287 A1 | 12/2020 | Hetz |
| 2020/0405529 A1 | 12/2020 | Taylor et al. |
| 2021/0000564 A1 | 1/2021 | Derek et al. |
| 2021/0093390 A1 | 4/2021 | Poltaretskyi et al. |
| 2021/0121246 A1 | 4/2021 | Gudalo |
| 2021/0128254 A1 | 5/2021 | Geric et al. |
| 2021/0169578 A1 | 6/2021 | Calloway et al. |
| 2021/0169581 A1 | 6/2021 | Calloway et al. |
| 2021/0174956 A1 | 6/2021 | Mcginley et al. |
| 2021/0192759 A1 | 6/2021 | Lang |
| 2021/0193681 A1 | 6/2021 | Baek |
| 2021/0196381 A1 | 7/2021 | Eckert et al. |
| 2021/0196383 A1 | 7/2021 | Shelton, IV et al. |
| 2021/0203889 A1 | 7/2021 | Fung et al. |
| 2021/0205020 A1 | 7/2021 | Shelton, IV et al. |
| 2021/0212717 A1 | 7/2021 | Yates et al. |
| 2021/0236755 A1 | 8/2021 | King et al. |
| 2021/0259789 A1 | 8/2021 | Wright et al. |
| 2021/0264680 A1 | 8/2021 | Cvetko et al. |
| 2021/0267664 A1 | 9/2021 | Lennartz et al. |
| 2021/0306691 A1 | 9/2021 | Thomas et al. |
| 2021/0307861 A1 | 10/2021 | Hufford et al. |
| 2021/0313052 A1 | 10/2021 | Makrinich et al. |
| 2021/0333864 A1 | 10/2021 | Harvey et al. |
| 2021/0346092 A1 | 11/2021 | Redmond et al. |
| 2021/0369394 A1 | 12/2021 | Braido et al. |
| 2021/0385889 A1 | 12/2021 | Patel |
| 2022/0032442 A1 | 2/2022 | Sheffield et al. |
| 2022/0104896 A1 | 4/2022 | Shelton, IV et al. |
| 2022/0104897 A1 | 4/2022 | Shelton, IV et al. |
| 2022/0104911 A1 | 4/2022 | Shelton, IV et al. |
| 2022/0104912 A1 | 4/2022 | Shelton, IV et al. |
| 2022/0142573 A1 | 5/2022 | Li et al. |
| 2022/0151704 A1 | 5/2022 | Nikou |
| 2022/0155910 A1 | 5/2022 | Jeong |
| 2022/0160428 A1 | 5/2022 | Murray et al. |
| 2022/0188545 A1* | 6/2022 | Nagar .................... G06V 20/20 |
| 2022/0237878 A1* | 7/2022 | Tartz ........................ G06F 3/14 |
| 2022/0257333 A1 | 8/2022 | Haider |
| 2022/0261056 A1 | 8/2022 | Motoi et al. |
| 2022/0283631 A1 | 9/2022 | Peng |
| 2022/0287676 A1 | 9/2022 | Steines et al. |
| 2022/0313338 A1 | 10/2022 | Carroll et al. |
| 2022/0313341 A1 | 10/2022 | Wiener et al. |
| 2022/0313342 A1 | 10/2022 | Leuck et al. |
| 2022/0313357 A1 | 10/2022 | Geresy et al. |
| 2022/0313369 A1 | 10/2022 | Oberkircher et al. |
| 2022/0313370 A1 | 10/2022 | Morgan et al. |
| 2022/0313371 A1 | 10/2022 | Morgan et al. |
| 2022/0313372 A1 | 10/2022 | Herman et al. |
| 2022/0313373 A1 | 10/2022 | Morgan et al. |
| 2022/0317750 A1 | 10/2022 | Jayme et al. |
| 2022/0317751 A1 | 10/2022 | Samuel et al. |
| 2022/0318179 A1 | 10/2022 | Morgan et al. |
| 2022/0319685 A1 | 10/2022 | Vachon et al. |
| 2022/0319693 A1 | 10/2022 | Oberkircher et al. |
| 2022/0321059 A1 | 10/2022 | Samuel et al. |
| 2022/0322523 A1 | 10/2022 | Jayme et al. |
| 2022/0331013 A1 | 10/2022 | Shelton, IV et al. |
| 2022/0331047 A1 | 10/2022 | Shelton, IV et al. |
| 2022/0331048 A1 | 10/2022 | Shelton, IV et al. |
| 2022/0331050 A1 | 10/2022 | Shelton, IV et al. |
| 2022/0331051 A1 | 10/2022 | Shelton, IV et al. |
| 2022/0331052 A1 | 10/2022 | Shelton, IV et al. |
| 2022/0331053 A1 | 10/2022 | Kimball et al. |
| 2022/0331054 A1 | 10/2022 | Kimball et al. |
| 2022/0331056 A1 | 10/2022 | Shelton, IV et al. |
| 2022/0334787 A1 | 10/2022 | Jogan et al. |
| 2022/0335604 A1 | 10/2022 | Vanosdoll et al. |
| 2022/0335660 A1 | 10/2022 | Shelton, IV et al. |
| 2022/0335696 A1 | 10/2022 | Shelton, IV et al. |
| 2022/0336078 A1 | 10/2022 | Wise et al. |
| 2022/0336097 A1 | 10/2022 | Shelton, IV et al. |
| 2022/0337891 A1 | 10/2022 | Burnley et al. |
| 2022/0338049 A1 | 10/2022 | Ross et al. |
| 2022/0387128 A1 | 12/2022 | Bail et al. |
| 2023/0038130 A1 | 2/2023 | Cvetko et al. |
| 2023/0071306 A1 | 3/2023 | Miller et al. |
| 2023/0072423 A1 | 3/2023 | Osborn et al. |
| 2023/0121709 A1 | 4/2023 | Xu et al. |
| 2023/0157757 A1 | 5/2023 | Braido et al. |
| 2023/0157762 A1 | 5/2023 | Braido et al. |
| 2024/0130795 A1 | 4/2024 | Clayton et al. |
| 2024/0138931 A1 | 5/2024 | Lefauconnier |
| 2024/0176441 A1 | 5/2024 | Yang et al. |

FOREIGN PATENT DOCUMENTS

| | | |
|---|---|---|
| EP | 0473987 A1 | 3/1992 |
| EP | 0929263 B1 | 7/1999 |
| EP | 1006892 B1 | 6/2009 |
| EP | 2942023 A2 | 11/2015 |
| EP | 3053279 A1 | 8/2016 |
| EP | 3387982 A1 | 10/2018 |
| JP | 2001029353 A | 2/2001 |
| WO | WO-0112089 A1 | 2/2001 |
| WO | WO-2008053485 A1 | 5/2008 |
| WO | WO-2014031800 A1 | 2/2014 |
| WO | WO-2014071184 A1 | 5/2014 |
| WO | WO-2015047693 A1 | 4/2015 |
| WO | 2016154557 A1 | 9/2016 |
| WO | WO-2017058617 A2 | 4/2017 |
| WO | WO-2018116247 A1 | 6/2018 |
| WO | WO-2019215354 A1 | 11/2019 |
| WO | 2020112217 A1 | 6/2020 |
| WO | 2020180917 A1 | 9/2020 |

(56) References Cited

FOREIGN PATENT DOCUMENTS

| WO | WO-2021044136 A1 | 3/2021 |
|----|------------------|--------|
| WO | 2021/146313 A1   | 7/2021 |

OTHER PUBLICATIONS

IEEE Std 802.Mar. 2012 (Revision of IEEE Std 802.Mar. 2008, published Dec. 28, 2012.

Sorrells, P., "Application Note AN680. Passive RFID Basics," retrieved from http://ww1.microchip.com/downloads/en/AppNotes/00680b.pdf on Feb. 26, 2020, Dec. 31, 1998, pp. 1-7.

Zhu et al. "Haptic-feedback smart glove as a creative human-machine interface (HMI) for virtual/augmented reality applications," Sci. Adv, vol. 6, No. 19, May 8, 2020.

Qian, et al., "A Review of Augmented Reality in Robotic-Assisted Surgery", IEEE Transactions On Medical Robotics and Bionics, IEEE, vol. 2, No. 1, pp. 1-16, Feb. 2020.

Yu et al., "Skin-Integrated Wireless Haptic Interfaces for Virtual and Augmented Reality," Nature, vol. 575, pp. 473-479, Nov. 21, 2019.

Li et al., "Wearable Energy Harvesters Generating Electricity From Low-Frequency Human Limb Movement," Microsystems & Nanoengineering (2018), vol. 4(24), 13 pages.

Vávra et al., "Recent Development of Augmented Reality in Surgery: A Review", Journal of Healthcare Engineering, vol. 2017, Article ID 4574172, Aug. 21, 2017, pp. 1-9.

Zherdeva et al., "Virtual Scalpel Simulation In The VR and AR Environments", Proceedings Of SPIE, vol. 11310, 7 pages, Feb. 19, 2020.

* cited by examiner

SYSTEMS AND METHODS FOR CONTROLLING SURGICAL DATA OVERLAY

CROSS-REFERENCE TO RELATED APPLICATIONS

This application claims the benefit under 35 U.S.C. § 119 (e) to U.S. Provisional Patent Application No. 63/174,674, titled HEADS UP DISPLAY, filed Apr. 14, 2021 and to U.S. Provisional Patent Application No. 63/284,326, titled INTRAOPERATIVE DISPLAY FOR SURGICAL SYSTEMS, filed Nov. 30, 2021, the disclosure of each of which is herein incorporated by reference in its entirety.

BACKGROUND

This disclosure relates to apparatuses, systems, and methods for providing an augmented reality interactive experience during a surgical procedure. During a surgical procedure it would be desirable to provide an augmented reality interactive experience of a real-world environment where objects that reside in the real world are enhanced by overlaying computer-generated perceptual information, sometimes across multiple sensory modalities, including visual, auditory, haptic, somatosensory, and olfactory. In the context of this disclosure, images of a surgical field and surgical instruments and other objects appearing in the surgical field are enhanced by overlaying computer-generated visual, auditory, haptic, somatosensory, olfactory, or other sensory information onto the real world images of the surgical field and instruments or other objects appearing in the surgical field. The images may be streamed in real time or may be still images.

Real world surgical instruments include a variety of surgical devices including energy, staplers, or combined energy and staplers. Energy based medical devices include, without limitation, radio-frequency (RF) based monopolar and bipolar electrosurgical instruments, ultrasonic surgical instruments, combination RF electrosurgical and ultrasonic instruments, combination RF electrosurgical and mechanical staplers, among others. Surgical stapler devices are surgical instruments used to cut and staple tissue in a variety of surgical procedures, including bariatric, thoracic, colorectal, gynecologic, urologic and general surgery.

SUMMARY

In various instances, this disclosure provides a surgical system including an imaging device, a display, and a control system operably coupled to the imaging device and the display. The display is configured to show a livestream of a surgical field of a surgical procedure. The livestream is captured by the imaging device. The control system is configured to overlay, on the livestream, a first amount of information associated with the surgical procedure, detect an event configured to cause the first amount of information being overlaid to increase to a second amount of information being overlaid, compare the second amount of information to a distraction threshold, adjust the second amount of information to a third amount of information based on the comparison, and overlay, on the livestream, the third amount of information based on the second amount of information being adjusted. The third amount of information is less than the distraction threshold.

In various instances, this disclosure provides a surgical system including an imaging device, a display, a situational awareness module, and a control system operably coupled to the imaging device, the display, and the situational awareness module. The display is configured to show a livestream of a surgical field of a surgical procedure. The livestream is captured by the imaging device. The control system is configured to overlay, on the livestream, information associated with the surgical procedure, determine, by the situational awareness module, a step of the surgical procedure, and adjust the overlaid information according to the determined step of the surgical procedure.

In various instances, this disclosure provides a surgical system including an imaging device, a display, and a control system operably coupled to the imaging device and the display. The display is configured to show a livestream of a surgical field of a surgical procedure. The livestream is captured by the imaging device. The control system is configured to overlay, on the livestream, information associated with a surgical procedure, receive an input signal corresponding to a parameter associated with a user performing the surgical procedure, and adjust the overlaid information according to the parameter associated with the user.

FIGURES

The various aspects described herein, both as to organization and methods of operation, together with further objects and advantages thereof, may best be understood by reference to the following description, taken in conjunction with the accompanying drawings as follows.

Corresponding reference characters indicate corresponding parts throughout the several views. The exemplifications set out herein illustrate various disclosed embodiments, in one form, and such exemplifications are not to be construed as limiting the scope thereof in any manner.

DESCRIPTION

Figure 1:
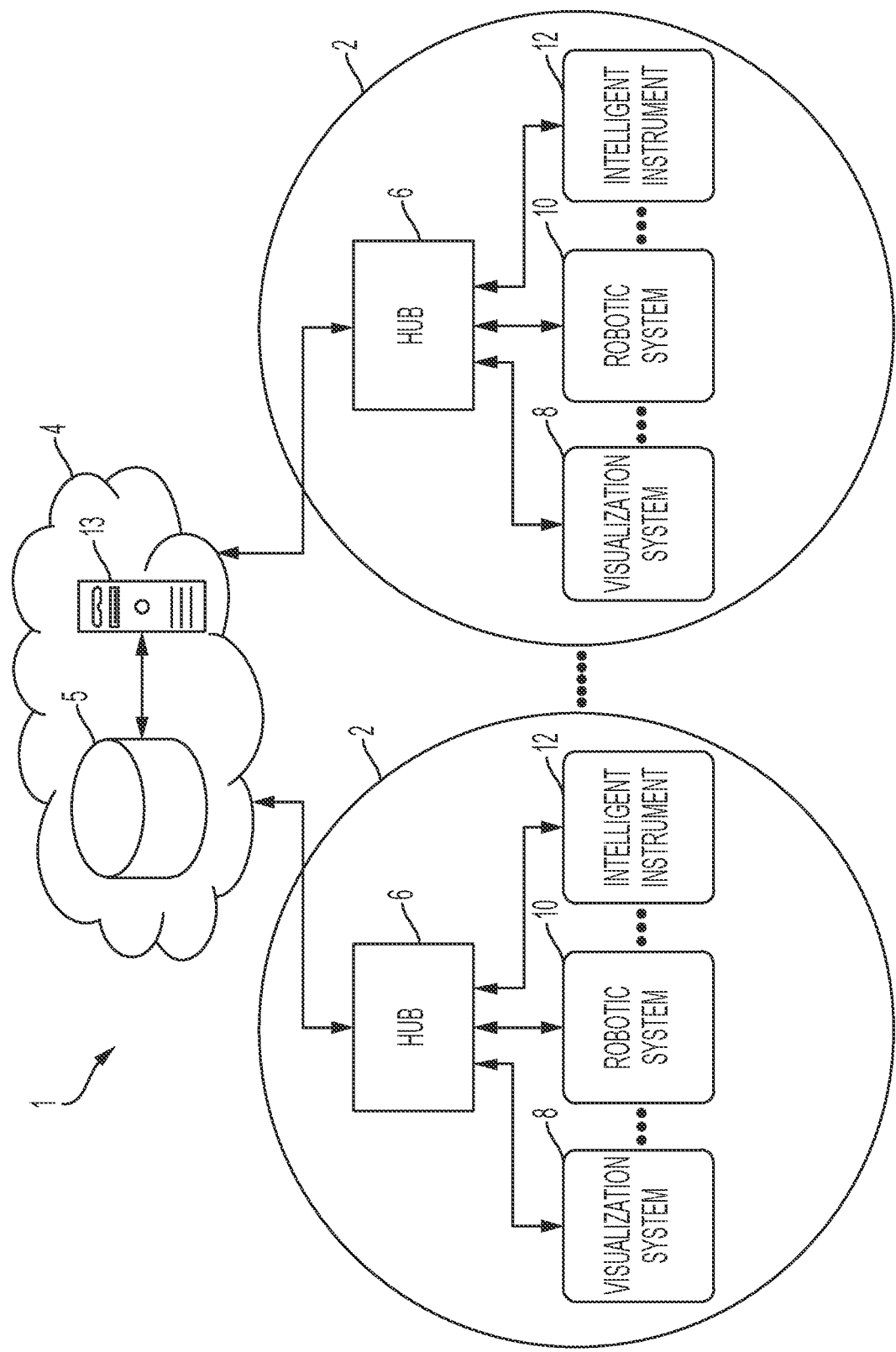
FIG. 1 is a block diagram of a computer-implemented interactive surgical system, according to one aspect of this disclosure.

Applicant of the present application owns the following U.S. Patent Applications filed concurrently herewith, the disclosures of each of which is herein incorporated by reference in its entirety:

U.S. patent application Ser. No. 17/688,589, filed Mar. 7, 2022, titled METHOD FOR INTRAOPERATIVE DISPLAY FOR SURGICAL SYSTEMS;

U.S. patent application Ser. No. 17/688,597, filed Mar. 7, 2022, titled UTILIZATION OF SURGICAL DATA VALUES AND SITUATIONAL AWARENESS TO CONTROL THE OVERLAY IN SURGICAL FIELD VIEW;

U.S. patent application Ser. No. 17/688,605, filed Mar. 7, 2022, titled SELECTIVE AND ADJUSTABLE MIXED REALITY OVERLAY IN SURGICAL FIELD VIEW;

U.S. patent application Ser. No. 17/688,615, filed Mar. 7, 2022, titled RISK BASED PRIORITIZATION OF DISPLAY ASPECTS IN SURGICAL FIELD VIEW;

U.S. patent application Ser. No. 17/688,633, filed Mar. 7, 2022, titled SYSTEMS AND METHODS FOR CHANGING DISPLAY OVERLAY OF SURGICAL FIELD VIEW BASED ON TRIGGERING EVENTS;

U.S. patent application Ser. No. 17/688,638, filed Mar. 7, 2022, titled CUSTOMIZATION OF OVERLAID DATA AND CONFIGURATION;

U.S. patent application Ser. No. 17/688,641, filed Mar. 7, 2022, titled INDICATION OF THE COUPLE PAIR OF REMOTE CONTROLS WITH REMOTE DEVICES FUNCTIONS;

U.S. patent application Ser. No. 17/688,646, filed Mar. 7, 2022, titled COOPERATIVE OVERLAYS OF INTERACTING INSTRUMENTS WHICH RESULT IN BOTH OVERLAYS BEING EFFECTED;

U.S. patent application Ser. No. 17/688,651, filed Mar. 7, 2022, titled ANTICIPATION OF INTERACTIVE UTILIZATION OF COMMON DATA OVERLAYS BY DIFFERENT USERS;

U.S. patent application Ser. No. 17/688,653, filed Mar. 7, 2022, titled MIXING DIRECTLY VISUALIZED WITH RENDERED ELEMENTS TO DISPLAY BLENDED ELEMENTS AND ACTIONS HAPPENING ON-SCREEN AND OFF-SCREEN;

U.S. patent application Ser. No. 17/688,655, filed Mar. 7, 2022, titled SYSTEM AND METHOD FOR TRACKING A PORTION OF THE USER AS A PROXY FOR NON-MONITORED INSTRUMENT;

U.S. patent application Ser. No. 17/688,5656, filed Mar. 7, 2022, titled UTILIZING CONTEXTUAL PARAMETERS OF ONE OR MORE SURGICAL DEVICES TO PREDICT A FREQUENCY INTERVAL FOR DISPLAYING SURGICAL INFORMATION;

U.S. patent application Ser. No. 17/688,660, filed Mar. 7, 2022, titled COOPERATION AMONG MULTIPLE DISPLAY SYSTEMS TO PROVIDE A HEALTHCARE USER CUSTOMIZED INFORMATION;

U.S. patent application Ser. No. 17/688,663, filed Mar. 7, 2022, titled INTRAOPERATIVE DISPLAY FOR SURGICAL SYSTEMS;

U.S. patent application Ser. No. 17/688,667, filed Mar. 7, 2022, titled ADAPTATION AND ADJUSTABILITY OR OVERLAID INSTRUMENT INFORMATION FOR SURGICAL SYSTEMS; and U.S. patent application Ser. No. 17/688,671, filed Mar. 7, 2022, titled MIXED REALITY FEEDBACK SYSTEMS THAT COOPERATE TO INCREASE EFFICIENT PERCEPTION OF COMPLEX DATA FEEDS.

Applicant of this application owns the following U.S. Patent Applications, the disclosure of each of which is herein incorporated by reference in its entirety:

U.S. patent application Ser. No. 16/209,423, titled METHOD OF COMPRESSING TISSUE WITHIN A STAPLING DEVICE AND SIMULTANEOUSLY DISPLAYING THE LOCATION OF THE TISSUE WITHIN THE JAWS, now U.S. Patent Publication No. US-2019-0200981-A1;

U.S. patent application Ser. No. 16/209,453, titled METHOD FOR CONTROLLING SMART ENERGY DEVICES, now U.S. Patent Publication No. US-2019-0201046-A1.

Before explaining various aspects of surgical devices and generators in detail, it should be noted that the illustrative examples are not limited in application or use to the details of construction and arrangement of parts illustrated in the accompanying drawings and description. The illustrative examples may be implemented or incorporated in other aspects, variations and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects and/or examples.

Various aspects are directed to onscreen displays for surgical systems for a variety of energy and surgical stapler based medical devices. Energy based medical devices include, without limitation, radio-frequency (RF) based monopolar and bipolar electrosurgical instruments, ultrasonic surgical instruments, combination RF electrosurgical and ultrasonic instruments, combination RF electrosurgical and mechanical staplers, among others. Surgical stapler devices include and combined surgical staplers with electrosurgical and/or ultrasonic devices. Aspects of the ultrasonic surgical devices can be configured for transecting and/or coagulating tissue during surgical procedures, for example. Aspects of the electrosurgical devices can be configured for transecting, coagulating, sealing, welding and/or desiccating tissue during surgical procedures, for example. Aspects of the surgical stapler devices can be configured for transecting and stapling tissue during surgical procedures and in some aspects, the surgical stapler devices may be configured to delivery RF energy to the tissue during surgical procedures. Electrosurgical devices are configured to deliver therapeutic and/or nontherapeutic RF energy to the tissue. Elements of surgical staplers, electrosurgical, and ultrasonic devices may be used in combination in a single surgical instrument.

In various aspects, the present disclosure provides onscreen displays of real time information to the OR team during a surgical procedure. In accordance with various aspects of the present disclosure, many new and unique onscreen displays are provided to display onscreen a variety of visual information feedback to the OR team. According to the present disclosure, visual information may comprise one or more than one of various visual media with or without sound. Generally, visual information comprises still photography, motion picture photography, video or audio recording, graphic arts, visual aids, models, display, visual presentation services, and the support processes. The visual information can be communicated on any number of display options such as the primary OR screen, the energy or surgical stapler device itself, a tablet, augmented reality glasses, among others, for example.

In various aspects, the present disclosure provides a large list of potential options to communicate visual information in real time to the OR team, without overwhelming the OR team with too much visual information. For example, in various aspects, the present disclosure provides onscreen displays of visual information to enable the surgeon, or other members of the OR team, to selectively activate onscreen displays such as icons surrounding the screen option to manage a wealth of visual information. One or a combination of factors can be used to determine the active display, these may include energy based (e.g., electrosurgical, ultrasonic) or mechanical based (e.g., staplers) surgical devices in use, the estimated risk associated with a given display, the experience level of the surgeon and the surgeons' choice among other things. In other aspect, the visual information may comprises rich data overlaid or superimposed into the surgical field of view to manage the visual information. In various aspects described hereinbelow, comprise superimposed imagery that requires video analysis and tracking to properly overlay the data. Visual information data communicated in this manner, as opposed to static icons, may provide additional useful visual information in a more concise and easy to understand way to the OR team.

In various aspects, the present disclosure provides techniques for selectively activating onscreen displays such as icons surrounding the screen to manage visual information during a surgical procedure. In other aspects, the present disclosure provides techniques for determining the active display using one or a combination of factors. In various aspects, the techniques according to the resent disclosure may comprise selecting the energy based or mechanical based surgical device in use as the active display, estimating risk associated with a given display, utilizing the experience level of the surgeon or OR team making the selection, among other things.

In other aspects, the techniques according to the present disclosure may comprise overlaying or superimposing rich data onto the surgical field of view to manage the visual information. A number of the display arrangements described by the present disclosure involve overlaying various visual representations of surgical data onto a livestream of a surgical field. As used herein the term overlay comprises a translucent overlay, a partial overlay, and/or a moving overlay. Graphical overlays may be in the form of a transparent graphic, semitransparent graphic, or opaque graphic, or a combination of transparent, semitransparent, and opaque elements or effects. Moreover, the overlay can be positioned on, or at least partially on, or near an object in the surgical field such as, for example, an end effector and/or a critical surgical structure. Certain display arrangements may comprise a change in one or more display elements of an overlay including a change in color, size, shape, display time, display location, display frequency, highlighting, or a combination thereof, based on changes in display priority values. The graphical overlays are rendered on top of the active display monitor to convey important information quickly and efficiently to the OR team.

In other aspects, the techniques according to the present disclosure may comprise superimposing imagery that requires analyzing video and tracking for properly overlaying the visual information data. In other aspects, the techniques according to the present disclosure may comprise communicating rich visual information, as opposed to simple static icons, to provide additional visual information to the OR team in a more concise and easy to understand manner. In other aspects, the visual overlays may be used in combination with audible and/or somatosensory overlays such as thermal, chemical, and mechanical devices, and combinations thereof.

The following description is directed generally to apparatuses, systems, and methods that provide an augmented reality (AR) interactive experience during a surgical procedure. In this context, images of a surgical field and surgical instruments and other objects appearing in the surgical field are enhanced by overlaying computer-generated visual, auditory, haptic, somatosensory, olfactory, or other sensory information onto the real world images of the surgical field, instruments, and/or other objects appearing in the surgical field. The images may be streamed in real time or may be still images. Augmented reality is a technology for rendering and displaying virtual or "augmented" virtual objects, data, or visual effects overlaid on a real environment. The real environment may include a surgical field. The virtual objects overlaid on the real environment may be represented as anchored or in a set position relative to one or more aspects of the real environment. In a non-limiting example, if a real world object exits the real environment field of view, a virtual object anchored to the real world object would also exit the augmented reality field of view.

A number of the display arrangements described by the present disclosure involve overlaying various visual representations of surgical data onto a livestream of a surgical field. As used herein the term overlaying comprises a translucent overlay, a partial overlay, and/or a moving overlay. Moreover, the overlay can be positioned on, or at least partially on, or near an object in the surgical field such as, for example, an end effector and/or a critical surgical structure. Certain display arrangements may comprise a change in one or more display elements of an overlay including a change in color, size, shape, display time, display location, display frequency, highlighting, or a combination thereof, based on changes in display priority values.

As described herein AR is an enhanced version of the real physical world that is achieved through the use of digital visual elements, sound, or other sensory stimuli delivered via technology. Virtual Reality (VR) is a computer-generated environment with scenes and objects that appear to be real, making the user feel they are immersed in their surroundings. This environment is perceived through a device known as a Virtual Reality headset or helmet. Mixed reality (MR) and AR are both considered immersive technologies, but they aren't the same. MR is an extension of Mixed reality that allows real and virtual elements to interact in an environment. While AR adds digital elements to a live view often by using a camera, an MR experience combines elements of both AR and VR, where real-world and digital objects interact.

In an AR environment, one or more computer-generated virtual objects may be displayed along with one or more real (i.e., so-called "real world") elements. For example, a real-time image or video of a surrounding environment may be shown on a computer screen display with one or more overlaying virtual objects. Such virtual objects may provide complementary information relating to the environment or generally enhance a user's perception and engagement with the environment. Conversely, the real-time image or video of the surrounding environment may additionally or alternatively enhance a user's engagement with the virtual objects shown on the display.

The apparatuses, systems, and methods in the context of this disclosure enhance images received from one or more imaging devices during a surgical procedure. The imaging devices may include a variety of scopes used during non-invasive and minimally invasive surgical procedures, an AR device, and/or a camera to provide images during open surgical procedures. The images may be streamed in real time or may be still images. The apparatuses, systems, and methods provide an augmented reality interactive experience by enhancing images of the real world surgical environment by overlaying virtual objects or representations of data and/or real objects onto the real surgical environment. The augmented reality experience may be viewed on a display and/or an AR device that allows a user to view the overlaid virtual objects onto the real world surgical environment. The display may be located in the operating room or remote from the operating room. AR devices are worn on the head of the surgeon or other operating room personnel and typically include two stereo-display lenses or screens, including one for each eye of the user. Natural light is permitted to pass through the two transparent or semi-transparent display lenses such that aspects of the real environment are visible while also projecting light to make virtual objects visible to the user of the AR device.

Two or more displays and AR devices may be used in a coordinated manner, for example with a first display or AR device controlling one or more additional displays or AR devices in a system with defined roles. For example, when activating display or an AR device, a user may select a role (e.g., surgeon, surgical assistant, nurse, etc., during a surgical procedure) and the display or AR device may display information relevant to that role. For example, a surgical assistant may have a virtual representation of an instrument displayed that the surgeon needs to perform for a next step of a surgical procedure. A surgeon's focus on the current step may see different information displayed than the surgical assistant.

Although there are many known onscreen displays and alerts, this disclosure provides many new and unique augmented reality interactive experiences during a surgical procedure. Such augmented reality interactive experiences include visual, auditory, haptic, somatosensory, olfactory, or other sensory feedback information to the surgical team inside or outside the operating room. The virtual feedback information overlaid onto the real world surgical environment may be provided to an operating room (OR) team, including personnel inside the OR including, without limitation, the operating surgeon, assistants to the surgeon, a scrub person, an anesthesiologist and a circulating nurse, among others, for example. The virtual feedback information can be communicated on any number of display options such as a primary OR screen display, an AR device, the energy or surgical stapler instrument, a tablet, augmented reality glasses, device etc.

FIG. 1 depicts a computer-implemented interactive surgical system 1 that includes one or more surgical systems 2 and a cloud-based system 4. The cloud-based system 4 may include a remote server 13 coupled to a storage device 5. Each surgical system 2 includes at least one surgical hub 6 in communication with the cloud 4. For example, the surgical system 2 may include a visualization system 8, a robotic system 10, and handheld intelligent surgical instruments 12, each configured to communicate with one another and/or the hub 6. In some aspects, a surgical system 2 may include an M number of hubs 6, an N number of visualization systems 8, an O number of robotic systems 10, and a P number of handheld intelligent surgical instruments 12, where M, N, O, and P are integers greater than or equal to one. The computer-implemented interactive surgical system 1 may be configured to provide an augmented reality interactive experience during a surgical procedure as described herein.

Figure 2:
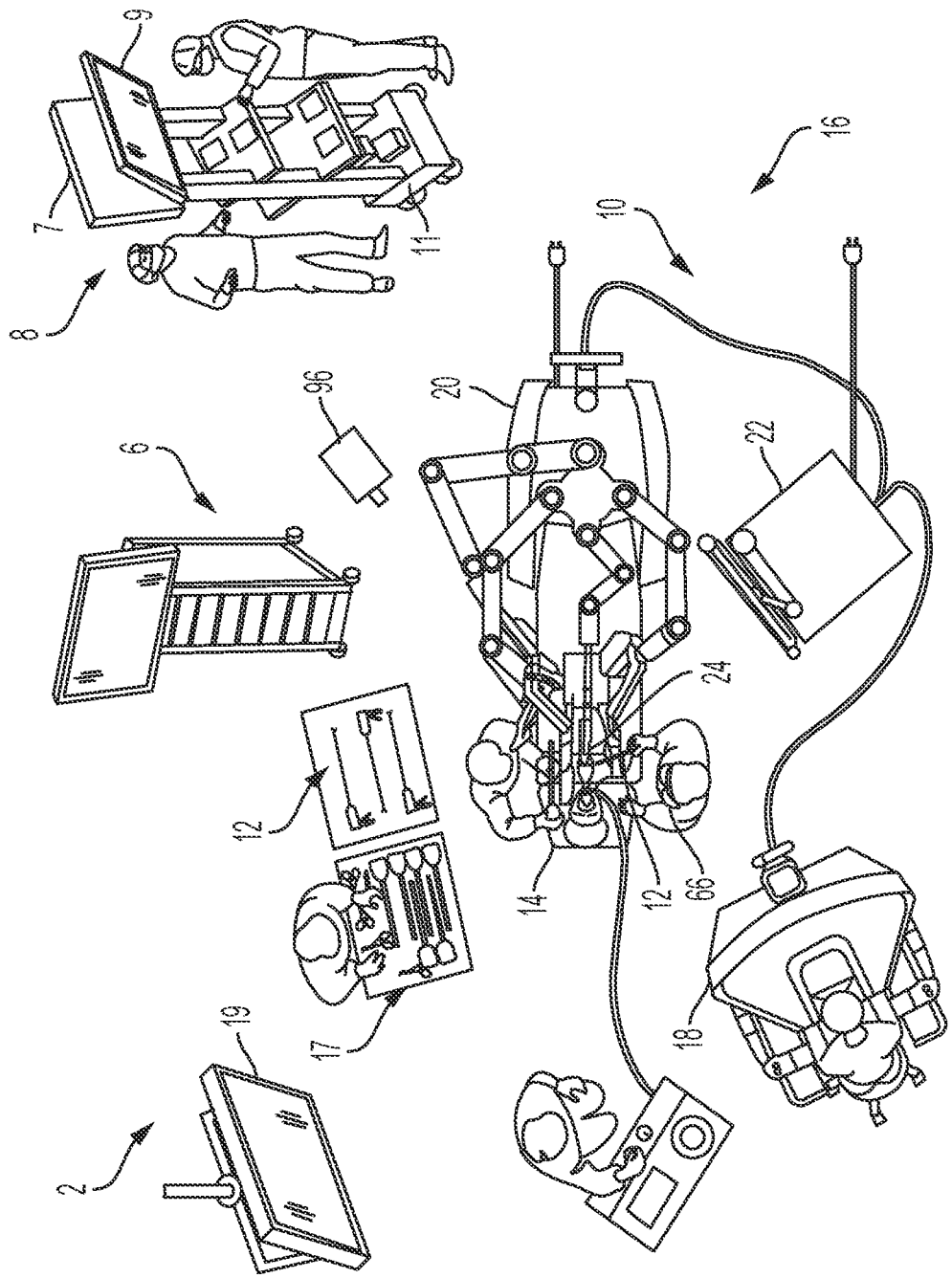
FIG. 2 is a surgical system being used to perform a surgical procedure in an operating room, according to one aspect of this disclosure.

FIG. 2 depicts an example of a surgical system 2 to perform a surgical procedure on a patient lying down on an operating table 14 in a surgical operating room 16. A robotic system 10 is used in the surgical procedure as a part of the surgical system 2. The robotic system 10 includes a surgeon's console 18, a patient side cart 20 (surgical robot), and a surgical robotic hub 22. The patient side cart 20 can manipulate at least one removably coupled surgical tool 17 through a minimally invasive incision in the body of the patient while the surgeon views the surgical site through the surgeon's console 18 or an augmented reality (AR) device 66 worn by the surgeon. An image (e.g., still or live streamed in real time) of the surgical site during a minimally invasive procedure can be obtained by a medical imaging device 24. The patient side cart 20 can manipulate the imaging device 24 to orient the imaging device 24. An image of an open surgical procedure can be obtained by a medical imaging device 96. The robotic hub 22 processes the images of the surgical site for subsequent display on the surgeon's console 18 or the AR device 66 worn by the surgeon, or other person in the surgical operating room 16.

The optical components of the imaging device 24, 96 or AR device 66 may include one or more illumination sources and/or one or more lenses. The one or more illumination sources may be directed to illuminate portions of the surgical field. One or more image sensors may receive light reflected or refracted from tissue and instruments in the surgical field.

In various aspects, the imaging device 24 is configured for use in a minimally invasive surgical procedure. Examples of imaging devices suitable for use with this disclosure include, but not limited to, an arthroscope, angioscope, bronchoscope, choledochoscope, colonoscope, cytoscope, duodenoscope, enteroscope, esophagogastro-duodenoscope (gastroscope), endoscope, laryngoscope, nasopharyngoneproscope, sigmoidoscope, thoracoscope, and ureteroscope. In various aspects, the imaging device 96 is configured for use in an open (invasive) surgical procedure.

In various aspects, the visualization system 8 includes one or more imaging sensors, one or more image-processing units, one or more storage arrays, and one or more displays that are strategically arranged with respect to the sterile field. In one aspect, the visualization system 8 includes an interface for HL7, PACS, and EMR. In one aspect, the imaging device 24 may employ multi-spectrum monitoring to discriminate topography and underlying structures. A multispectral image captures image data within specific wavelength ranges in the electromagnetic spectrum. Wavelengths are separated by filters or instruments sensitive to particular wavelengths, including light from frequencies beyond the visible light range, e.g., IR and ultraviolet. Spectral imaging can extract information not visible to the human eye. Multi-spectrum monitoring can relocate a surgical field after a surgical task is completed to perform tests on the treated tissue.

FIG. 2 depicts a primary display 19 positioned in the sterile field to be visible to an operator at the operating table 14. A visualization tower 11 is positioned outside the sterile field and includes a first non-sterile display 7 and a second non-sterile display 9, which face away from each other. The visualization system 8, guided by the hub 6, is configured to utilize the displays 7, 9, 19 to coordinate information flow to operators inside and outside the sterile field. For example, the hub 6 may cause the visualization system 8 to display AR images of the surgical site, as recorded by an imaging device 24, 96 on a non-sterile display 7, 9, or through the AR device 66, while maintaining a live feed of the surgical site on the primary display 19 or the AR device 66. The non-sterile display 7, 9 can permit a non-sterile operator to perform a diagnostic step relevant to the surgical procedure, for example.

Figure 3:
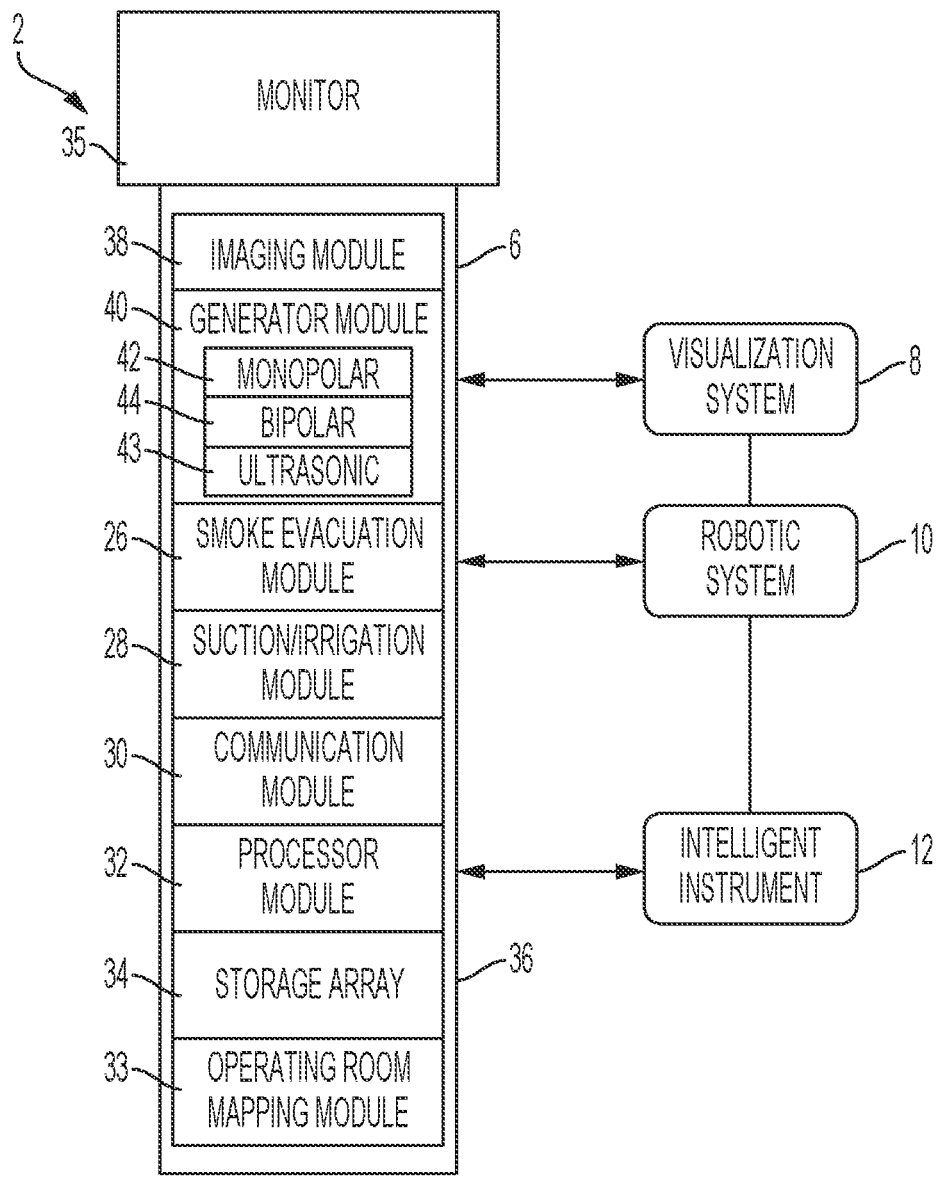
FIG. 3 is a surgical hub paired with a visualization system, a robotic system, and an intelligent instrument, according to one aspect of this disclosure.
Figure 10:
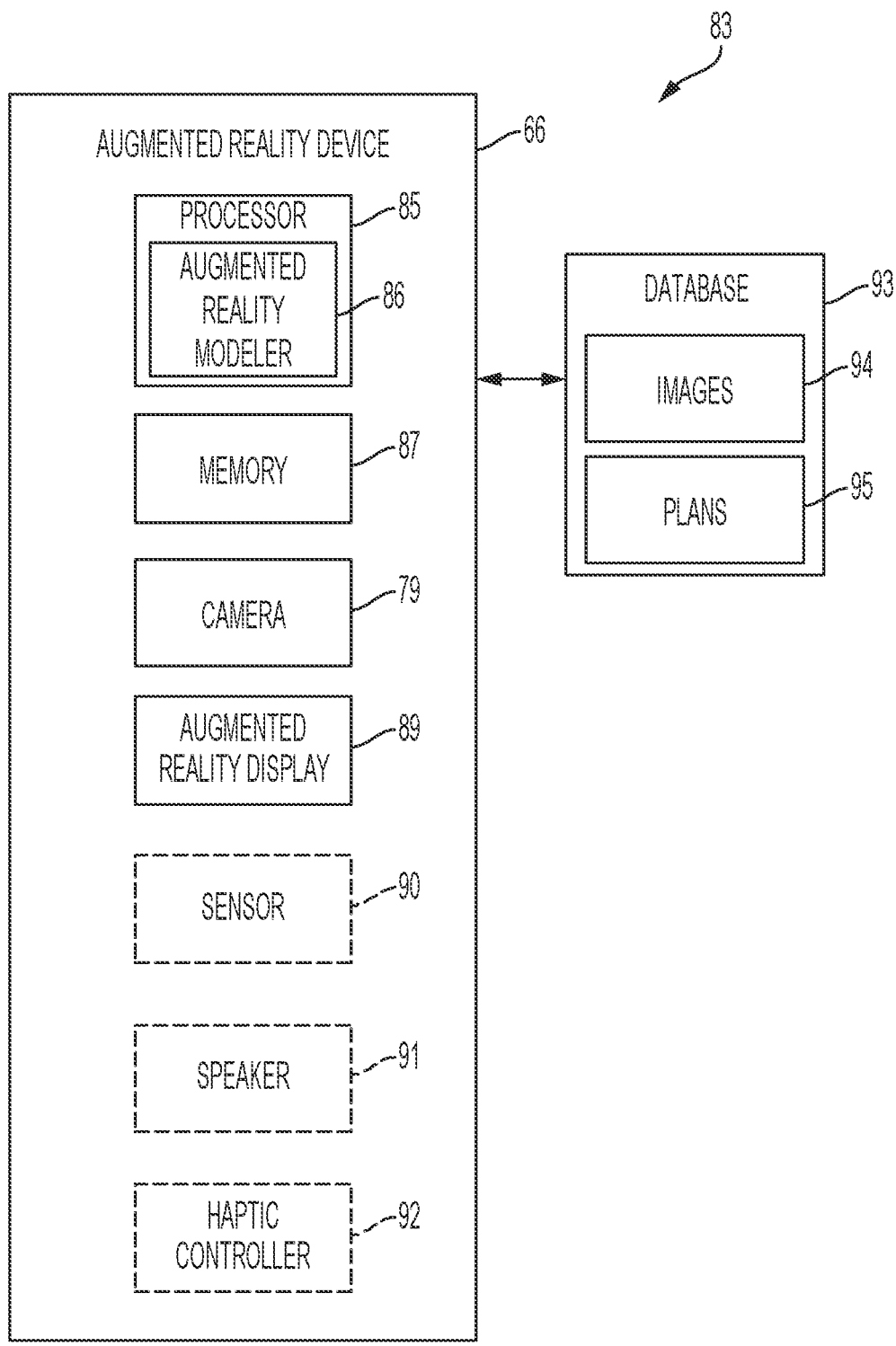
FIG. 10 illustrates a system for augmenting surgical instrument information using an augmented reality display, according to one aspect of this disclosure.

FIG. 3 depicts a hub 6 in communication with a visualization system 8, a robotic system 10, and a handheld intelligent surgical instrument 12. The hub 6 includes a hub display 35, an imaging module 38, a generator module 40, a communication module 30, a processor module 32, a storage array 34, and an operating room mapping module 33. The hub 6 further includes a smoke evacuation module 26 and/or a suction/irrigation module 28. In various aspects, the imaging module 38 comprises an AR device 66 and the processor module 32 comprises an integrated video processor and an augmented reality modeler (e.g., as shown in FIG. 10). A modular light source may be adapted for use with various imaging devices. In various examples, multiple imaging devices may be placed at different positions in the surgical field to provide multiple views (e.g., non-invasive, minimally invasive, invasive or open surgical procedures). The imaging module 38 can be configured to switch between the imaging devices to provide an optimal view. In various aspects, the imaging module 38 can be configured to integrate the images from the different imaging devices and provide an augmented reality interactive experience during a surgical procedure as described herein.

Figure 4:
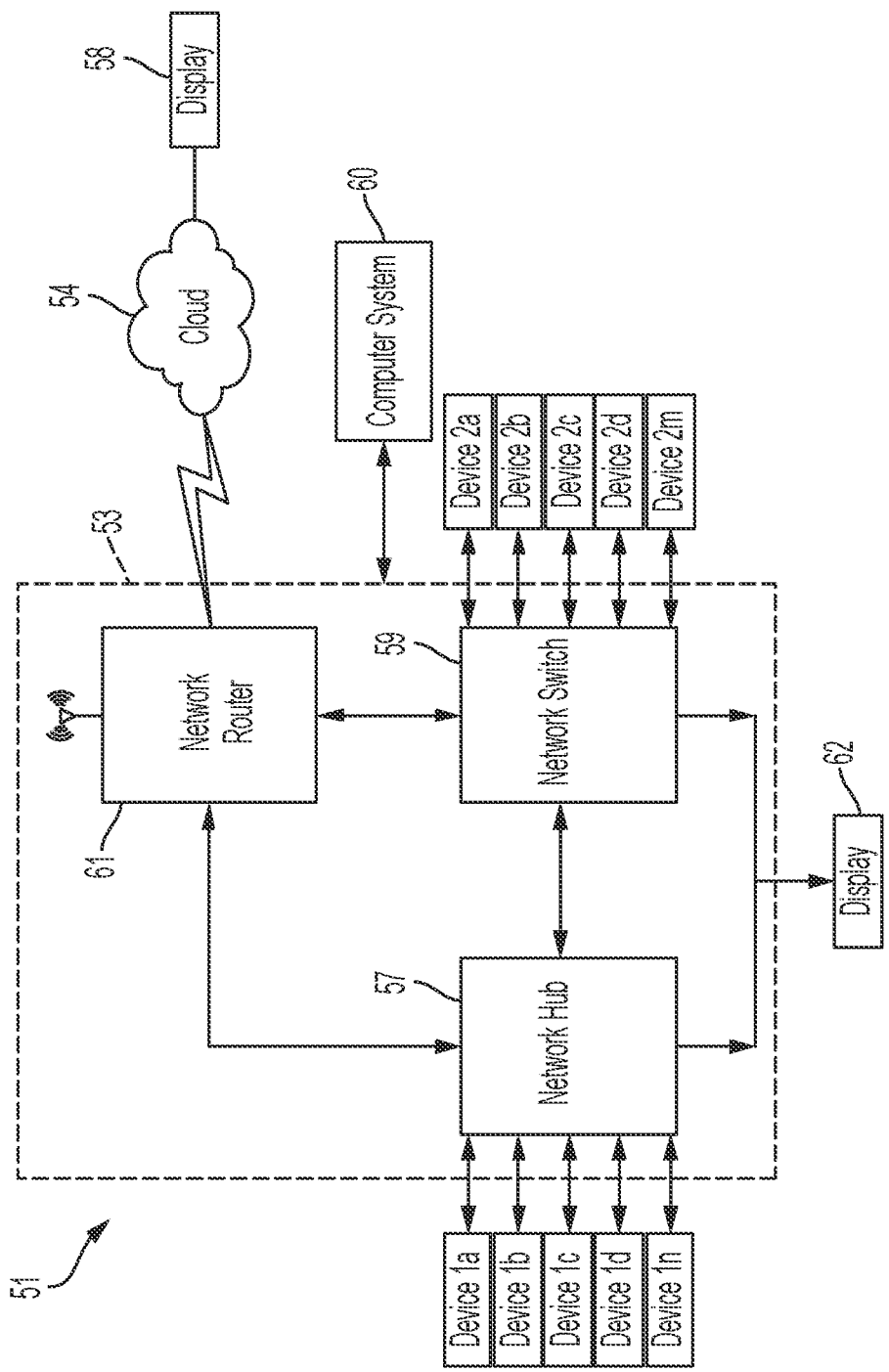
FIG. 4 illustrates a surgical data network comprising a modular communication hub configured to connect modular devices located in one or more operating theaters of a healthcare facility, or any room in a healthcare facility specially equipped for surgical operations, to the cloud, according to one aspect of this disclosure.

FIG. 4 shows a surgical data network 51 comprising a modular communication hub 53 configured to connect modular devices located in one or more operating theaters/rooms of a healthcare facility to a cloud-based system. The cloud 54 may include a remote server 63 (FIG. 5) coupled to a storage device 55. The modular communication hub 53 comprises a network hub 57 and/or a network switch 59 in communication with a network router 61. The modular communication hub 53 is coupled to a local computer system 60 to process data. Modular devices 1a-1n in the operating theater may be coupled to the modular communication hub 53. The network hub 57 and/or the network switch 59 may be coupled to a network router 61 to connect the devices 1a-1n to the cloud 54 or the local computer system 60. Data associated with the devices 1a-1n may be transferred to cloud-based computers via the router for remote data processing and manipulation. The operating theater devices 1a-1n may be connected to the modular communication hub 53 over a wired channel or a wireless channel. The surgical data network 51 environment may be employed to provide an augmented reality interactive experience during a surgical procedure as described herein and in particular providing augmented images if the surgical field to one or more than one remote display 58.

Figure 5:
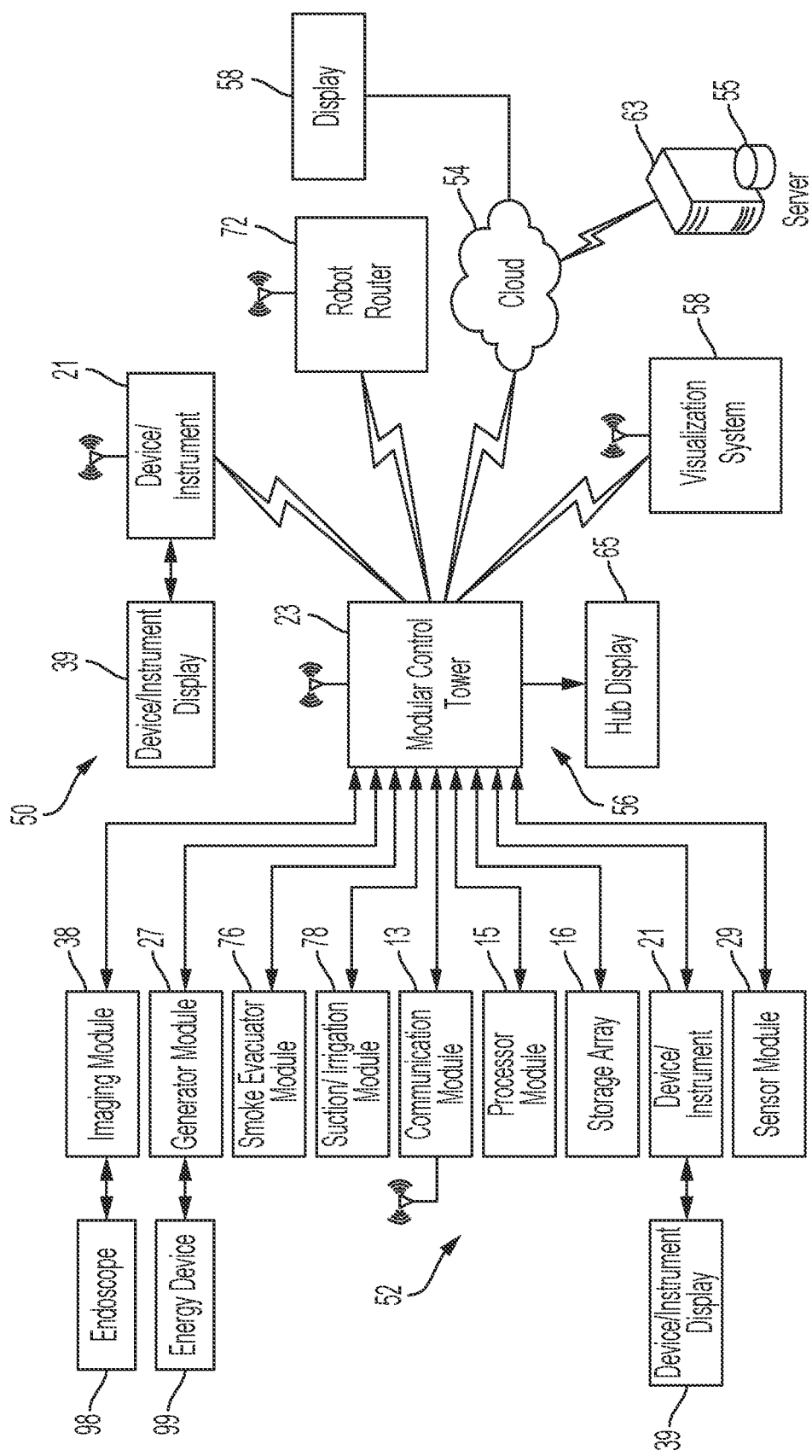
FIG. 5 illustrates a computer-implemented interactive surgical system, according to one aspect of this disclosure.
Figure 6:
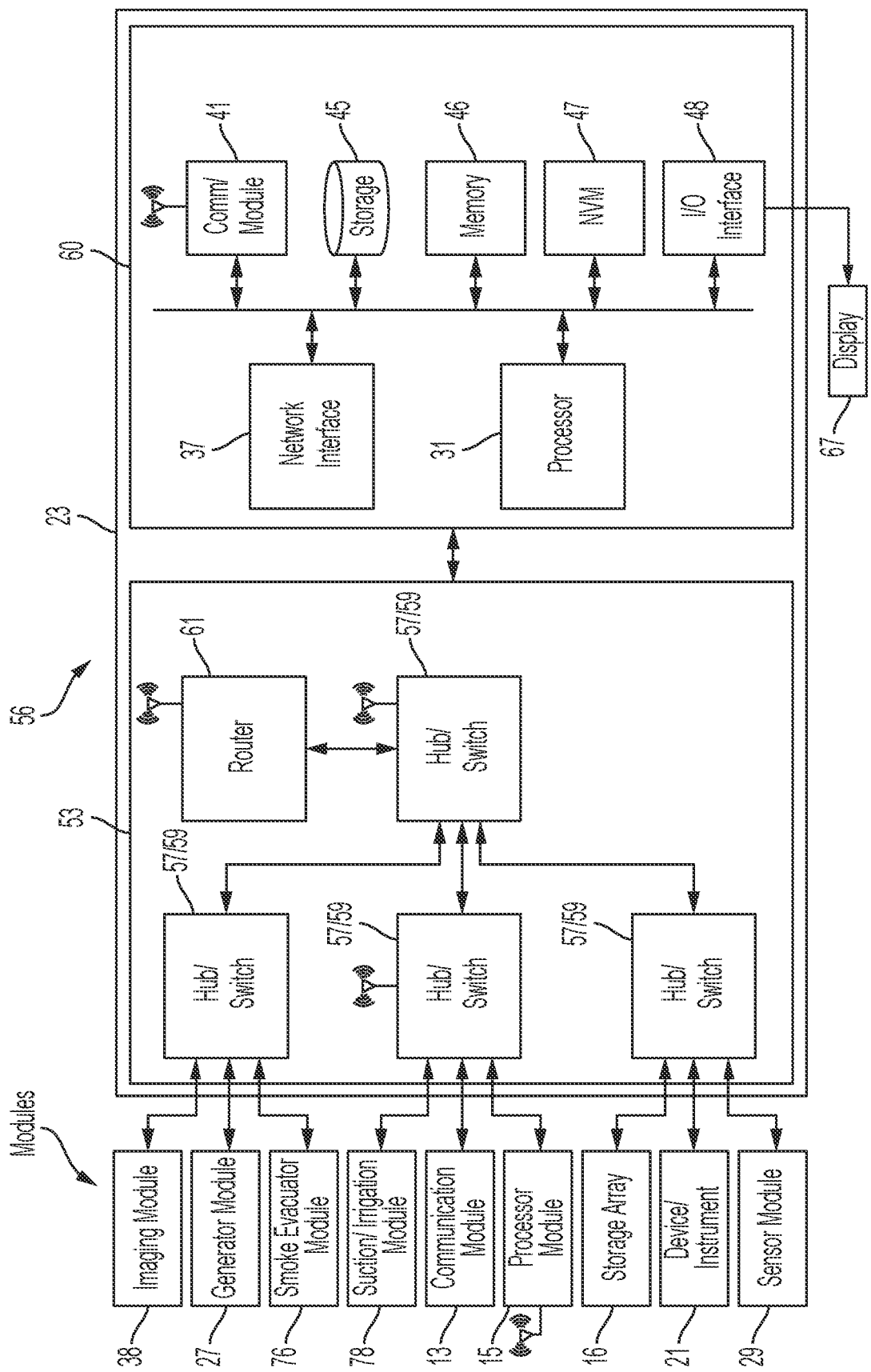
FIG. 6 illustrates a surgical hub comprising a plurality of modules coupled to the modular control tower, according to one aspect of this disclosure.

FIG. 5 illustrates a computer-implemented interactive surgical system 50. The computer-implemented interactive surgical system 50 is similar in many respects to the computer-implemented interactive surgical system 1. The computer-implemented interactive surgical system 50 includes one or more surgical systems 52, which are similar in many respects to the surgical systems 2. Each surgical system 52 includes at least one surgical hub 56 in communication with a cloud 54 that may include a remote server 63. In one aspect, the computer-implemented interactive surgical system 50 comprises a modular control tower 23 connected to multiple operating theater devices such as, for example, intelligent surgical instruments, robots, and other computerized devices located in the operating theater. As shown in FIG. 6, the modular control tower 23 comprises a modular communication hub 53 coupled to a computer system 60.

Back to FIG. 5, the modular control tower 23 is coupled to an imaging module 38 that is coupled to an endoscope 98, a generator module 27 that is coupled to an energy device 99, a smoke evacuator module 76, a suction/irrigation module 78, a communication module 13, a processor module 15, a storage array 16, a smart device/instrument 21 optionally coupled to a display 39, and a sensor module 29. The operating theater devices are coupled to cloud computing resources such as server 63, data storage 55, and displays 58 via the modular control tower 23. A robot hub 72 also may be connected to the modular control tower 23 and to the servers 63, data storage 55, and displays 58. The devices/instruments 21, visualization systems 58, among others, may be coupled to the modular control tower 23 via wired or wireless communication standards or protocols, as described herein. The modular control tower 23 may be coupled to a hub display 65 (e.g., monitor, screen) to display augmented images received comprising overlaid virtual objects on the real surgical field received from the imaging module 38, device/instrument display 39, and/or other visualization systems 58. The hub display 65 also may display data received from devices connected to the modular control tower 23 in conjunction with images and overlaid images.

FIG. 6 illustrates a surgical hub 56 comprising a plurality of modules coupled to the modular control tower 23. The modular control tower 23 comprises a modular communication hub 53, e.g., a network connectivity device, and a computer system 60 to provide local processing, visualization, and imaging of augmented surgical information, for example. The modular communication hub 53 may be connected in a tiered configuration to expand the number of modules (e.g., devices) that may be connected to the modular communication hub 53 and transfer data associated with the modules to the computer system 60, cloud computing resources, or both. Each of the network hubs/switches 57, 59 in the modular communication hub 53 may include three downstream ports and one upstream port. The upstream network hub/switch 57, 59 is connected to a processor 31 to provide a communication connection to the cloud computing resources and a local display 67. Communication to the cloud 54 may be made either through a wired or a wireless communication channel.

The computer system 60 comprises a processor 31 and a network interface 37. The processor 31 is coupled to a communication module 41, storage 45, memory 46, non-volatile memory 47, and input/output interface 48 via a system bus. The system bus can be any of several types of bus structure(s) including the memory bus or memory controller, a peripheral bus or external bus, and/or a local bus using any variety of available bus architectures.

The processor 31 comprises an augmented reality modeler (e.g., as shown in FIG. 10) and may be implemented as a single-core or multicore processor such as those known under the trade name ARM Cortex by Texas Instruments. In one aspect, the processor may be an LM4F230H5QR ARM Cortex-M4F Processor Core, available from Texas Instruments, for example, comprising an on-chip memory of 256 KB single-cycle flash memory, or other non-volatile memory, up to 40 MHZ, a prefetch buffer to improve performance above 40 MHz, a 32 KB single-cycle serial random access memory (SRAM), an internal read-only memory (ROM) loaded with StellarisWare® software, a 2 KB electrically erasable programmable read-only memory (EEPROM), and/or one or more pulse width modulation (PWM) modules, one or more quadrature encoder inputs (QEI) analogs, one or more 12-bit analog-to-digital converters (ADCs) with 12 analog input channels, details of which are available for the product datasheet.

The system memory includes volatile memory and non-volatile memory. The basic input/output system (BIOS), containing the basic routines to transfer information between elements within the computer system, such as during start-up, is stored in non-volatile memory. For example, the non-volatile memory can include ROM, programmable ROM (PROM), electrically programmable ROM (EPROM), EEPROM, or flash memory. Volatile memory includes random-access memory (RAM), which acts as external cache memory. Moreover, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The computer system 60 also includes removable/non-removable, volatile/non-volatile computer storage media, such as for example disk storage. The disk storage includes, but is not limited to, devices like a magnetic disk drive, floppy disk drive, tape drive, Jaz drive, Zip drive, LS-60 drive, flash memory card, or memory stick. In addition, the disk storage can include storage media separately or in combination with other storage media including, but not limited to, an optical disc drive such as a compact disc ROM device (CD-ROM), compact disc recordable drive (CD-R Drive), compact disc rewritable drive (CD-RW Drive), or a digital versatile disc ROM drive (DVD-ROM). To facilitate the connection of the disk storage devices to the system bus, a removable or non-removable interface may be employed.

In various aspects, the computer system 60 of FIG. 6, the imaging module 38 and/or visualization system 58, and/or the processor module 15 of FIGS. 4-6, may comprise an image processor, image-processing engine, graphics processing unit (GPU), media processor, or any specialized digital signal processor (DSP) used for the processing of digital images. The image processor may employ parallel computing with single instruction, multiple data (SIMD) or multiple instruction, multiple data (MIMD) technologies to increase speed and efficiency. The digital image-processing engine can perform a range of tasks. The image processor may be a system on a chip with multicore processor architecture.

Figure 7:
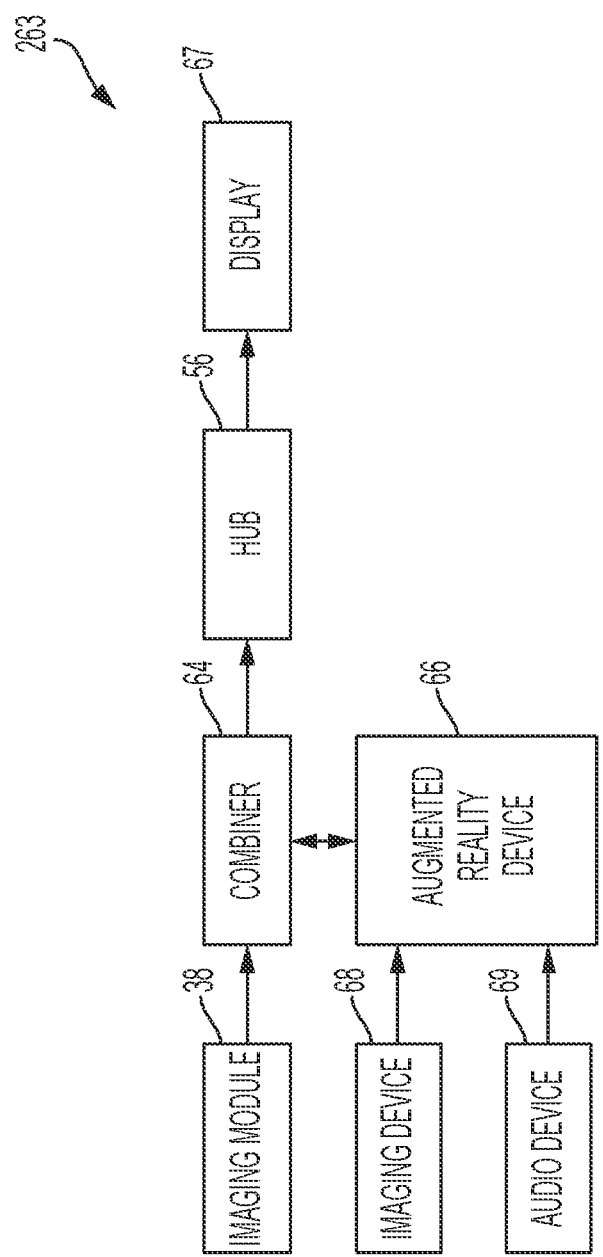
FIG. 7 illustrates an augmented reality (AR) system comprising an intermediate signal combiner positioned in the communication path between an imaging module and a surgical hub display, according to one aspect of this disclosure.

FIG. 7 illustrates an augmented reality (AR) system 263 comprising an intermediate signal combiner 64 positioned in the communication path between an imaging module 38 and a surgical hub display 67. The signal combiner 64 combines audio and/or image data received from an imaging module 38 and/or an AR device 66. The surgical hub 56 receives the combined data from the combiner 64 and overlays the data provided to the display 67, where the overlaid data is displayed. The imaging device 68 may be a digital video camera and the audio device 69 may be a microphone. The signal combiner 64 may comprise a wireless heads-up display adapter to couple to the AR device 66 placed into the communication path of the display 67 to a console allowing the surgical hub 56 to overlay data on the display 67.

Figure 8:
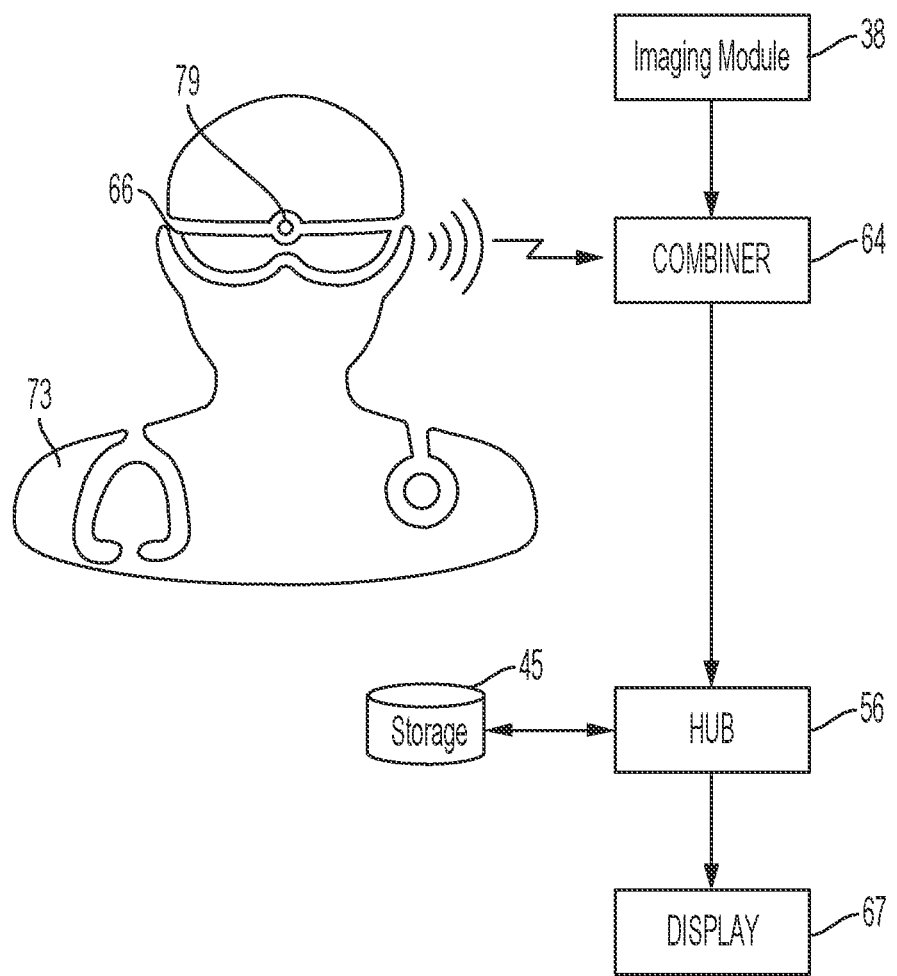
FIG. 8 illustrates an augmented reality (AR) system comprising an intermediate signal combiner positioned in the communication path between an imaging module and a surgical hub display, according to one aspect of this disclosure.

FIG. 8 illustrates an augmented reality (AR) system comprising an intermediate signal combiner positioned in the communication path between an imaging module and a surgical hub display. FIG. 8 illustrates an AR device 66 worn by a surgeon 73 to communicate data to the surgical hub 56. Peripheral information of the AR device 66 does not include active video. Rather, the peripheral information includes only device settings, or signals that do not have same demands of refresh rates. Interaction may augment the surgeon's 73 information based on linkage with preoperative computerized tomography (CT) or other data linked in the surgical hub 56. The AR device 66 can identify structure-ask whether instrument is touching a nerve, vessel, or adhesion, for example. The AR device 66 may include pre-operative scan data, an optical view, tissue interrogation properties acquired throughout procedure, and/or processing in the surgical hub 56 used to provide an answer. The surgeon 73 can dictate notes to the AR device 66 to be saved with patient data in the hub storage 45 for later use in report or in follow up.

The AR device 66 worn by the surgeon 73 links to the surgical hub 56 with audio and visual information to avoid the need for overlays, and allows customization of displayed information around periphery of view. The AR device 66 provides signals from devices (e.g., instruments), answers queries about device settings, or positional information linked with video to identify quadrant or position. The AR device 66 has audio control and audio feedback from the AR device 66. The AR device 66 is able to interact with other systems in the operating theater and have feedback and interaction available wherever the surgeon 73 is viewing. For example, the AR device 66 may receive voice or gesture initiated commands and queries from a surgeon, and the AR device 66 may provide feedback in the form of one or more modalities including audio, visual, or haptic touch.

Figure 9:
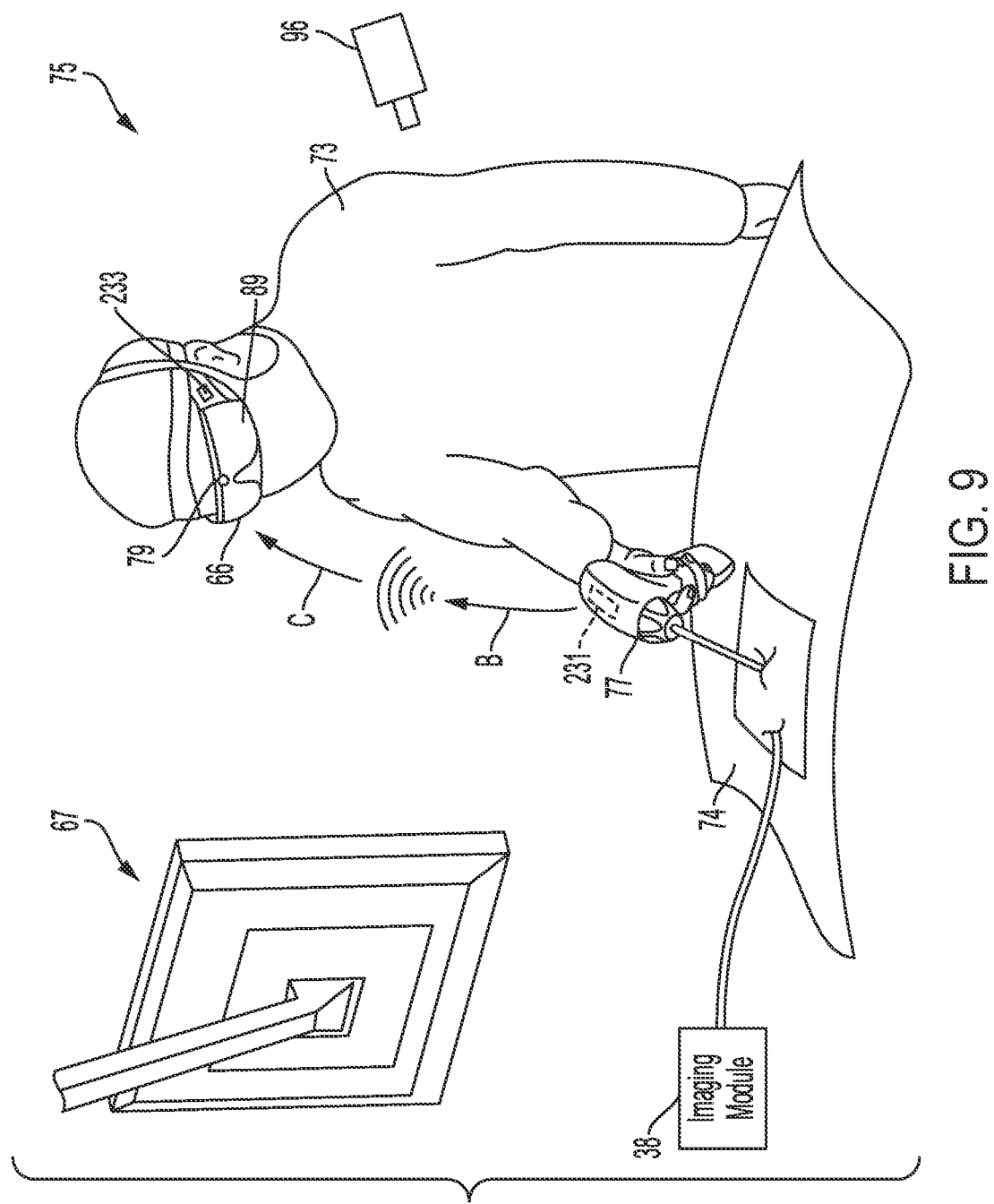
FIG. 9 illustrates an augmented reality (AR) device worn by a surgeon to communicate data to the surgical hub, according to one aspect of this disclosure.

FIG. 9 illustrates a surgeon 73 wearing an AR device 66, a patient 74, and may include a camera 96 in an operating room 75. The AR device 66 worn by the surgeon 73 may be used to present to the surgeon 73 a virtual object overlaid on a real time image of the surgical field through augmented reality display 89 or through the hub connected display 67. The real time image may include a portion of a surgical instrument 77. The virtual object may not be visible to others within the operating room 75 (e.g., surgical assistant or nurse), though they also may wear AR devices 66. Even if another person is viewing the operating room 75 with an AR device 66, the person may not be able to see the virtual object or may be able to see the virtual object in a shared augmented reality with the surgeon 73, or may be able to see a modified version of the virtual object (e.g., according to customizations unique to the surgeon 73) or may see different virtual objects.

A virtual object and/or data may be configured to appear on a portion of a surgical instrument 77 or in a surgical field of view captured by an imaging module 38, an imaging device 68 during minimally invasive surgical procedures, and/or the camera 96 during open surgical procedures. In the illustrated example, the imaging module 38 is a laparoscopic camera that provides a live feed of a surgical area during a minimally invasive surgical procedure. An AR system may present virtual objects that are fixed to a real object without regard to a perspective of a viewer or viewers of the AR system (e.g., the surgeon 73). For example, a virtual object may be visible to a viewer of the AR system inside the operating room 75 and not visible to a viewer of the AR system outside the operating room 75. The virtual object may be displayed to the viewer outside the operating room 75 when the viewer enters the operating room 75. The augmented image may be displayed on the surgical hub display 67 or the augmented reality display 89.

The AR device 66 may include one or more screens or lens, such as a single screen or two screens (e.g., one per eye of a user). The screens may allow light to pass through the screens such that aspects of the real environment are visible while displaying the virtual object. The virtual object may be made visible to the surgeon 73 by projecting light. A virtual object may appear to have a degree of transparency or may be opaque (i.e., blocking aspects of the real environment).

An AR system may be viewable to one or more viewers, and may include differences among views available for the one or more viewers while retaining some aspects as universal among the views. For example, a heads-up display may change between two views while virtual objects and/or data may be fixed to a real object or area in both views. Aspects such as a color of an object, lighting, or other changes may be made among the views without changing a fixed position of at least one virtual object.

A user may see a virtual object and/or data presented in an AR system as opaque or as including some level of transparency. In an example, the user may interact with the virtual object, such as by moving the virtual object from a first position to a second position. For example, the user may move an object with his or her hand. This may be done in the AR system virtually by determining that the hand has moved into a position coincident or adjacent to the object (e.g., using one or more cameras, which may be mounted on the AR device 66, such as AR device camera 79 or separate 96, and which may be static or may be controlled to move), and causing the object to move in response. Virtual aspects may include virtual representations of real world objects or may include visual effects, such as lighting effects, etc. The AR system may include rules to govern the behavior of virtual objects, such as subjecting a virtual object to gravity or friction, or may include other predefined rules that defy real world physical constraints (e.g., floating objects, perpetual motion, etc.). The AR device 66 may include a camera 79 on the AR device 66 (not to be confused with the camera 96, separate from the AR device 66). The AR device camera 79 or the camera 96 may include an infrared camera, an infrared filter, a visible light filter, a plurality of cameras, a depth camera, etc. The AR device 66 may project virtual items over a representation of a real environment, which may be viewed by a user.

The AR device 66 may be used in the operating room 75 during a surgical procedure, for example performed by the surgeon 73 on the patient 74. The AR device 66 may project or display virtual objects, such as a virtual object during the surgical procedure to augment the surgeon's vision. The surgeon 73 may view a virtual object using the AR device 66, a remote controller for the AR device 66, or may interact with a virtual object, for example, using a hand to "interact" with a virtual object or a gesture recognized by the camera 79 of the AR device 66. A virtual object may augment a surgical tool such as the surgical instrument 77. For example, the virtual object may appear (to the surgeon 73 viewing the virtual object through the AR device 66) to be coupled with or remain a fixed distance from the surgical instrument 77. In another example, the virtual object may be used to guide the surgical instrument 77, and may appear to be fixed to the patient 74. In certain examples, a virtual object may react to movements of other virtual or real-world objects in the surgical field. For example, the virtual object may be altered when a surgeon is manipulating a surgical instrument in proximity to the virtual object.

The augmented reality display system imaging device 38 capture a real image of a surgical area during a surgical procedure. An augmented reality display 89, 67 presents an overlay of an operational aspect of the surgical instrument 77 onto the real image of the surgical area. The surgical instrument 77 includes communications circuitry 231 to communicate operational aspects and functional data from the surgical instrument 77 to the AR device 66 via communication communications circuitry 233 on the AR device 66. Although the surgical instrument 77 and the AR device 66 are shown in RF wireless communication between circuits 231, 233 as indicated by arrows B, C, other communication techniques may employed (e.g., wired, ultrasonic, infrared, etc.). The overlay is related to the operational aspect of the surgical instrument 77 being actively visualized. The overlay combines aspects of tissue interaction in the surgical area with functional data from the surgical instrument 77. A processor portion of the AR device 66 is configured to receive the operational aspects and functional data from the surgical instrument 77, determine the overlay related to the operation of the surgical instrument 77, and combine the aspect of the tissue in the surgical area with the functional data from the surgical instrument 77. The augmented images indicate alerts relative to device performance considerations, alerts of incompatible usage, alerts on incomplete capture. Incompatible usage includes tissue out range conditions and tissue incorrectly balanced within the jaws of the end effector. Additional augmented images provide an indication of collateral events including indication of tissue tension and indication of foreign object detection. Other augmented images indicate device status overlays and instrument indication.

FIG. 10 illustrates a system 83 for augmenting images of a surgical field with information using an AR display 89, in accordance with at least one aspect of this disclosure. The system 83 may be used to perform the techniques described hereinbelow, for example, by using the processor 85. The system 83 includes one aspect of an AR device 66 that may be in communication with a database 93. The AR device 66 includes a processor 85, memory 87, an AR display 89, and a camera 79. The AR device 66 may include a sensor 90, a speaker 91, and/or a haptic controller 92. The database 93 may include image storage 94 or preoperative plan storage 95.

The processor 85 of the AR device 66 includes an augmented reality modeler 86. The augmented reality modeler 86 may be used by the processor 85 to create the augmented reality environment. For example, the augmented reality modeler 86 may receive images of the instrument in a surgical field, such as from the camera 79 or sensor 90, and create the augmented reality environment to fit within a display image of the surgical field of view. In another example, physical objects and/or date may be overlaid on the surgical field of view and/or the surgical instruments images and the augmented reality modeler 86 may use physical objects and data to present the augmented reality display of virtual object s and/or data in the augmented reality environment. For example, the augmented reality modeler 86 may use or detect an instrument at a surgical site of the patient and present a virtual object and/or data on the surgical instrument and/or an image of the surgical site in the surgical field of view captured by the camera 79. The AR display 89 may display the AR environment overlaid on a real environment. The display 89 may show a virtual object and/or data, using the AR device 66, such as in a fixed position in the AR environment.

The AR device 66 may include a sensor 90, such as an infrared sensor. The camera 79 or the sensor 90 may be used to detect movement, such as a gesture by a surgeon or other user, that may be interpreted by the processor 85 as attempted or intended interaction by the user with the virtual target. The processor 85 may identify an object in a real environment, such as through processing information received using the camera 79. In other aspects, the sensor 90 may be a tactile, audible, chemical, or thermal sensor to generate corresponding signals that may combined with various data feeds to create the augmented environment. The sensor 90 may include binaural audio sensors (spatial sound), inertial measurement (accelerometer, gyroscope, magnetometer) sensors, environmental sensors, depth camera sensors, hand and eye tracking sensors, and voice command recognition functions.

The AR display 89, for example during a surgical procedure, may present, such as within a surgical field while permitting the surgical field to be viewed through the AR display 89, a virtual feature corresponding to a physical feature hidden by an anatomical aspect of a patient. The virtual feature may have a virtual position or orientation corresponding to a first physical position or orientation of the physical feature. In an example, the virtual position or orientation of the virtual feature may include an offset from the first physical position or orientation of the physical feature. The offset may include a predetermined distance from the augmented reality display, a relative distance from the augmented reality display to the anatomical aspect, or the like.

In one example, the AR device 66 may be an individual AR device. In one aspect, the AR device 66 may be a HoloLens 2 AR device manufactured by Microsoft of Redmond, Wash. This AR device 66 includes a visor with lenses and binaural audio features (spatial sound), inertial measurement (accelerometer, gyroscope, magnetometer), environmental sensors, depth camera, and video camera, hand and eye tracking, and voice command recognition functions. It provides an improved field of view with high resolution by using mirrors to direct waveguides in front of wearer's eyes. Images can be enlarged by changing angles of mirrors. It also provides eye tracking to recognize users and adjust lens widths for specific users.

In another example, the AR device 66 may be a Snapchat Spectacles 3 AR device. This AR device provides the ability to capture paired images and recreate 3D depth mapping, add in virtual effects, and replay 3D videos. The AR device includes two HD cameras to capture 3D photos and videos at 60 fps—while four built-in microphones record immersive, high-fidelity audio. Images from both cameras combine to build out a geometric map of the real world around the user to provide a new sense of depth perception. Photos and videos may be wirelessly synchronized to external display devices.

In yet another example, the AR device 66 may be a Glass 2 AR device by Google. This AR device provides inertial measurement (accelerometer, gyroscope, magnetometer) information overlaid on lens (out of view) to supplement information.

In another example, the AR device 66 may be an Echo Frames AR device by Amazon. This AR device does not have cameras/displays. A microphone and speaker are linked to Alexa. This AR device provides less functionality than a heads-up display.

In yet another example, the AR device 66 may be a Focals AR device by North (Google). This AR device provides notification pusher/smartwatch analog; inertial measurement, screen overlay of information (weather, calendar, messages), voice control (Alexa) integration. This AR device provides basic heads-up display functionality.

In another example, the AR device 66 may be an Nreal AR device. This AR device includes spatial sound, two environmental cameras, a photo camera, IMU (accelerometer, gyroscope), ambient light sensor, proximity sensor functionality. A nebula projects application information on lenses.

In various other examples, the AR device 66 may be any one of the following commercially available AR devices: Magic Leap 1, Epson Moverio, Vuzix Blade AR, ZenFone AR, Microsoft AR glasses prototype, EyeTap to create collinear light to that of the environment directly into the retina. A beam splitter makes the same light seen by the eye available to the computer to process and overlay information, for example. AR visualization systems include HUD, contact lenses, glasses, virtual reality (VR) headsets, virtual retinal display, on in operating room displays, and/or smart contact lenses (bionic lenses).

Multi-user interfaces for the AR device 66 include virtual retinal displays such as raster displays drawn directly on retinas instead of on a screen in front of the eye, smart televisions, smart phones, and/or spatial displays such as Sony spatial display systems.

Other AR technology may include, for example, AR capture devices and software applications, AR creation devices and software applications, and AR cloud devices and software applications. AR capture devices and software applications include, for example, Apple Polycam app, Ubiquity 6 (Mirrorworld using Display.land app)—users can scan and get 3d image of real world (to create 3D model). AR creation devices and software applications include, for example, Adobe Aero, Vuforia, ARToolKit, Google ARCore, Apple ARKit, MAXST, Aurasma, Zappar, Blippar. AR cloud devices and software applications include, for example, Facebook, Google (world geometry, objection recognition, predictive data), Amazon AR Cloud (commerce), Microsoft Azure, Samsung Project Whare, Niantic, Magic Leap.

Situational awareness is the ability of some aspects of a surgical system to determine or infer information related to a surgical procedure from data received from databases and/or instruments. The information can include the type of procedure being undertaken, the type of tissue being operated on, or the body cavity that is the subject of the procedure. With the contextual information related to the surgical procedure, the surgical system can, for example, improve the manner in which it controls the modular devices (e.g., a robotic arm and/or robotic surgical tool) that are connected to it and provide contextualized information or suggestions to the surgeon during the course of the surgical procedure.

Figure 11:
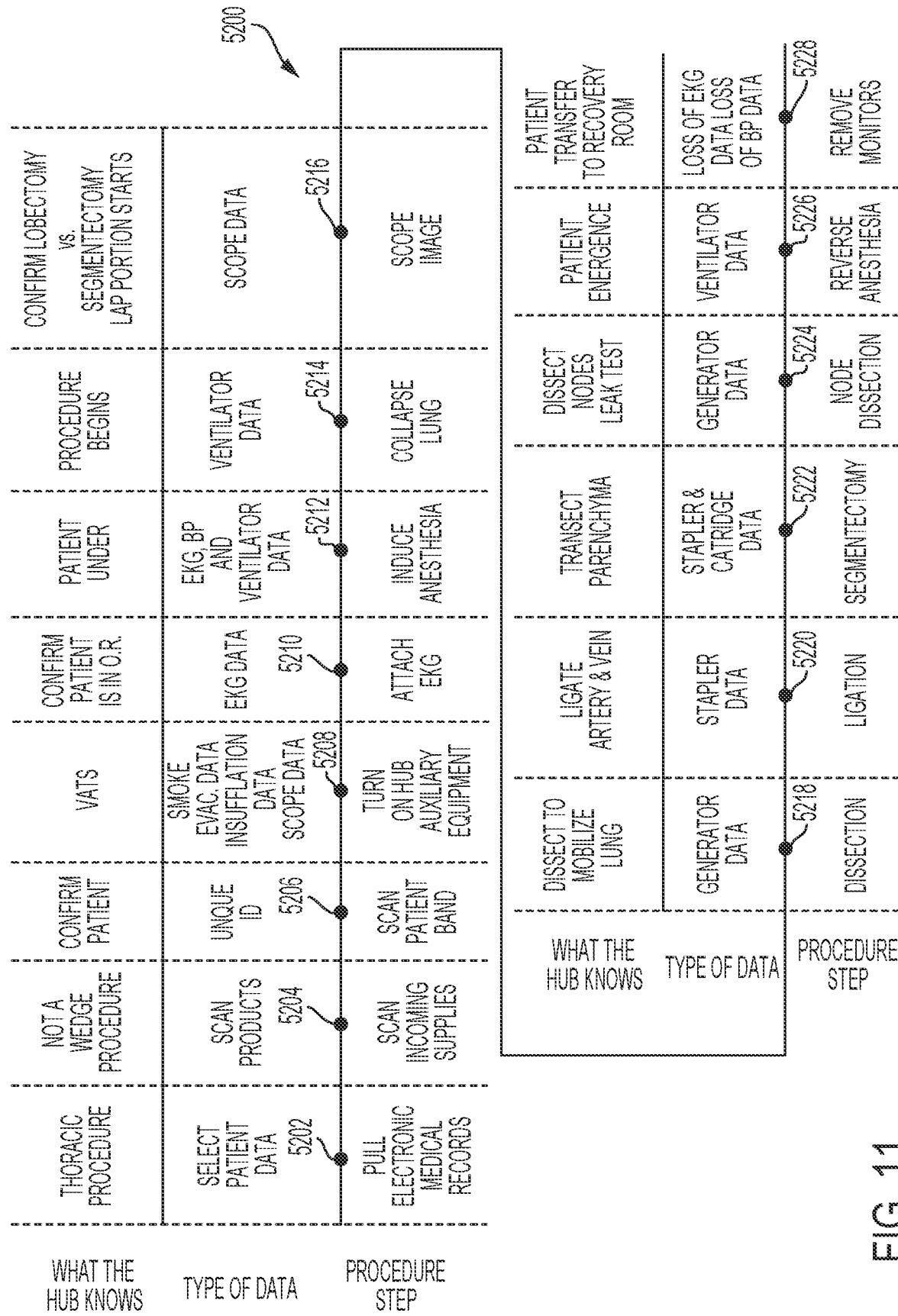
FIG. 11 illustrates a timeline of a situational awareness surgical procedure, according to one aspect of this disclosure.

FIG. 11 illustrates a timeline of a situational awareness surgical procedure. FIG. 11 illustrates a timeline 5200 of an illustrative surgical procedure and the contextual information that a surgical hub 5104 can derive from the data received from the data sources 5126 at each step in the surgical procedure. The timeline 5200 depicts the typical steps that would be taken by the nurses, surgeons, and other medical personnel during the course of a lung segmentectomy procedure, beginning with setting up the operating theater and ending with transferring the patient to a post-operative recovery room. The situationally aware surgical hub 5104 receives data from the data sources 5126 throughout the course of the surgical procedure, including data generated each time medical personnel utilize a modular device 5102 that is paired with the surgical hub 5104. The surgical hub 5104 can receive this data from the paired modular devices 5102 and other data sources 5126 and continually derive inferences (i.e., contextual information) about the ongoing procedure as new data is received, such as which step of the procedure is being performed at any given time. The situational awareness system of the surgical hub 5104 is able to, for example, record data pertaining to the procedure for generating reports, verify the steps being taken by the medical personnel, provide data or prompts (e.g., via a display screen) that may be pertinent for the particular procedural step, adjust modular devices 5102 based on the context (e.g., activate monitors, adjust the FOV of the medical imaging device, or change the energy level of an ultrasonic surgical instrument or RF electrosurgical instrument), and take any other such action described above.

First 5202, the hospital staff members retrieve the patient's EMR from the hospital's EMR database. Based on select patient data in the EMR, the surgical hub 5104 determines that the procedure to be performed is a thoracic procedure.

Second 5204, the staff members scan the incoming medical supplies for the procedure. The surgical hub 5104 cross-references the scanned supplies with a list of supplies that are utilized in various types of procedures and confirms that the mix of supplies corresponds to a thoracic procedure. Further, the surgical hub 5104 is also able to determine that the procedure is not a wedge procedure (because the incoming supplies either lack certain supplies that are necessary for a thoracic wedge procedure or do not otherwise correspond to a thoracic wedge procedure).

Third 5206, the medical personnel scan the patient band via a scanner 5128 that is communicably connected to the surgical hub 5104. The surgical hub 5104 can then confirm the patient's identity based on the scanned data.

Fourth 5208, the medical staff turns on the auxiliary equipment. The auxiliary equipment being utilized can vary according to the type of surgical procedure and the techniques to be used by the surgeon, but in this illustrative case they include a smoke evacuator, insufflator, and medical imaging device. When activated, the auxiliary equipment that are modular devices 5102 can automatically pair with the surgical hub 5104 that is located within a particular vicinity of the modular devices 5102 as part of their initialization process. The surgical hub 5104 can then derive contextual information about the surgical procedure by detecting the types of modular devices 5102 that pair with it during this pre-operative or initialization phase. In this particular example, the surgical hub 5104 determines that the surgical procedure is a VATS procedure based on this particular combination of paired modular devices 5102. Based on the combination of the data from the patient's EMR, the list of medical supplies to be used in the procedure, and the type of modular devices 5102 that connect to the hub, the surgical hub 5104 can generally infer the specific procedure that the surgical team will be performing. Once the surgical hub 5104 knows what specific procedure is being performed, the surgical hub 5104 can then retrieve the steps of that procedure from a memory or from the cloud and then cross-reference the data it subsequently receives from the connected data sources 5126 (e.g., modular devices 5102 and patient monitoring devices 5124) to infer what step of the surgical procedure the surgical team is performing.

Fifth 5210, the staff members attach the EKG electrodes and other patient monitoring devices 5124 to the patient. The EKG electrodes and other patient monitoring devices 5124 are able to pair with the surgical hub 5104. As the surgical hub 5104 begins receiving data from the patient monitoring devices 5124, the surgical hub 5104 thus confirms that the patient is in the operating theater.

Sixth 5212, the medical personnel induce anesthesia in the patient. The surgical hub 5104 can infer that the patient is under anesthesia based on data from the modular devices 5102 and/or patient monitoring devices 5124, including EKG data, blood pressure data, ventilator data, or combinations. Upon completion of the sixth step 5212, the pre-operative portion of the lung segmentectomy procedure is completed and the operative portion begins.

Seventh 5214, the patient's lung that is being operated on is collapsed (while ventilation is switched to the contralateral lung). The surgical hub 5104 can infer from the ventilator data that the patient's lung has been collapsed. The surgical hub 5104 can infer that the operative portion of the procedure has commenced as it can compare the detection of the patient's lung collapsing to the expected steps of the procedure (which can be accessed or retrieved previously) and thereby determine that collapsing the lung is the first operative step in this particular procedure.

Eighth 5216, the medical imaging device 5108 (e.g., a scope) is inserted and video from the medical imaging device is initiated. The surgical hub 5104 receives the medical imaging device data (i.e., still image data or live streamed video in real time) through its connection to the medical imaging device. Upon receipt of the medical imaging device data, the surgical hub 5104 can determine that the laparoscopic portion of the surgical procedure has commenced. Further, the surgical hub 5104 can determine that the particular procedure being performed is a segmentectomy, as opposed to a lobectomy (note that a wedge procedure has already been discounted by the surgical hub 5104 based on data received at the second step 5204 of the procedure). The data from the medical imaging device 124 (FIG. 2) can be utilized to determine contextual information regarding the type of procedure being performed in a number of different ways, including by determining the angle at which the medical imaging device is oriented with respect to the visualization of the patient's anatomy, monitoring the number or medical imaging devices being utilized (i.e., that are activated and paired with the surgical hub 5104), and monitoring the types of visualization devices utilized.

For example, one technique for performing a VATS lobectomy places the camera in the lower anterior corner of the patient's chest cavity above the diaphragm, whereas one technique for performing a VATS segmentectomy places the camera in an anterior intercostal position relative to the segmental fissure. Using pattern recognition or machine learning techniques, for example, the situational awareness system can be trained to recognize the positioning of the medical imaging device according to the visualization of the patient's anatomy. As another example, one technique for performing a VATS lobectomy utilizes a single medical imaging device, whereas another technique for performing a VATS segmentectomy utilizes multiple cameras. As yet another example, one technique for performing a VATS segmentectomy utilizes an infrared light source (which can be communicably coupled to the surgical hub as part of the visualization system) to visualize the segmental fissure, which is not utilized in a VATS lobectomy. By tracking any or all of this data from the medical imaging device 5108, the surgical hub 5104 can thereby determine the specific type of surgical procedure being performed and/or the technique being used for a particular type of surgical procedure.

Ninth 5218, the surgical team begins the dissection step of the procedure. The surgical hub 5104 can infer that the surgeon is in the process of dissecting to mobilize the patient's lung because it receives data from the RF or ultrasonic generator indicating that an energy instrument is being fired. The surgical hub 5104 can cross-reference the received data with the retrieved steps of the surgical procedure to determine that an energy instrument being fired at this point in the process (i.e., after the completion of the previously discussed steps of the procedure) corresponds to the dissection step.

Tenth 5220, the surgical team proceeds to the ligation step of the procedure. The surgical hub 5104 can infer that the surgeon is ligating arteries and veins because it receives data from the surgical stapling and cutting instrument indicating that the instrument is being fired. Similarly to the prior step, the surgical hub 5104 can derive this inference by cross-referencing the receipt of data from the surgical stapling and cutting instrument with the retrieved steps in the process.

Eleventh 5222, the segmentectomy portion of the procedure is performed. The surgical hub 5104 infers that the surgeon is transecting the parenchyma based on data from the surgical instrument, including data from a staple cartridge. The cartridge data may correspond to size or type of staple being fired by the instrument. The cartridge data can indicate the type of tissue being stapled and/or transected for different types of staples utilized in different types of tissues. The type of staple being fired is utilized for parenchyma or other tissue types to allow the surgical hub 5104 to infer that the segmentectomy procedure is being performed.

Twelfth 5224, the node dissection step is then performed. The surgical hub 5104 can infer that the surgical team is dissecting the node and performing a leak test based on data received from the generator indicating that an RF or ultrasonic instrument is being fired. For this particular procedure, an RF or ultrasonic instrument being utilized after parenchyma was transected corresponds to the node dissection step, which allows the surgical hub 5104 to make this inference. It should be noted that surgeons regularly switch back and forth between surgical stapling/cutting instruments and surgical energy (i.e., RF or ultrasonic) instruments depending upon the particular step in the procedure because different instruments are better adapted for particular tasks. Therefore, the particular sequence in which the stapling/cutting instruments and surgical energy instruments are used can indicate what step of the procedure the surgeon is performing. Upon completion of the twelfth step 5224, the incisions and closed up and the post-operative portion of the procedure begins.

Thirteenth 5226, the patient's anesthesia is reversed. The surgical hub 5104 can infer that the patient is emerging from the anesthesia based on the ventilator data (i.e., the patient's breathing rate begins increasing), for example.

Lastly, fourteenth 5228, the medical personnel remove the various patient monitoring devices 5124 from the patient. The surgical hub 5104 can thus infer that the patient is being transferred to a recovery room when the hub loses EKG, BP, and other data from the patient monitoring devices 5124. The surgical hub 5104 can determine or infer when each step of a given surgical procedure is taking place according to data received from the various data sources 5126 that are communicably coupled to the surgical hub 5104.

In addition to utilizing the patient data from EMR database(s) to infer the type of surgical procedure that is to be performed, as illustrated in the first step 5202 of the timeline 5200 depicted in FIG. 11, the patient data can also be utilized by a situationally aware surgical hub 5104 to generate control adjustments for the paired modular devices 5102.

Surgical displays (e.g. displays 7, 9, 19, 35, 62, 65, 66, 67, and 89) play an important function within the operating room, by provide useful information to a clinician (e.g. surgeon, surgical staff) that can used to, among other things, assess the progress of a surgical procedure, determine subsequent steps to take in the surgical procedure, monitor patent vital signs, etc. The displays need to be large enough such that this information being provided can be seen, yet not so large as to be overbearing and obstruct workflow or movement in a crowded operating room.

For example, an imaging device, such as one of the many imaging devices described elsewhere herein, is used to capture a livestream of a surgical field during a surgical procedure. A display shows this livestream captured by the imaging device such that the clinician can view the surgical field during the surgical procedure.

During the course of the surgical procedure, information that is relevant to or associated with the surgical procedure can be overlaid onto the livestream on the display. For example, an electrocardiogram (EKG) monitors a patient's heart rate during the surgical procedure and the monitored heart rate is overlaid on the livestream such that the clinician can ensure that the patient is stable.

Various other sensors, detectors, modules, etc. monitor other parameters over the course of the surgical procedure and information associated with these parameters can also be overlaid onto the display. However, some overlaid information may be of more significance than other overlaid information. As an example, when a clinician is manipulating tissue with an end effector of a surgical instrument, information regarding how much force is being applied to the tissue with the end effector is relevant to monitor so as to ensure the tissue isn't being unintentionally damaged.

However, owing the amount of information being overlaid on the display, more important information, such as a force being applied to the tissue, may be overlooked or missed by the clinician. This abundance of competing information can cause the surgeon to become overwhelmed with information that may be detrimental to their ability to adequately perform the surgical procedure, which can prove costly to the patient. Accordingly, there is a need to prioritize, control and/or limit the amount of data/information that is being overlaid on the display.

Figure 12:
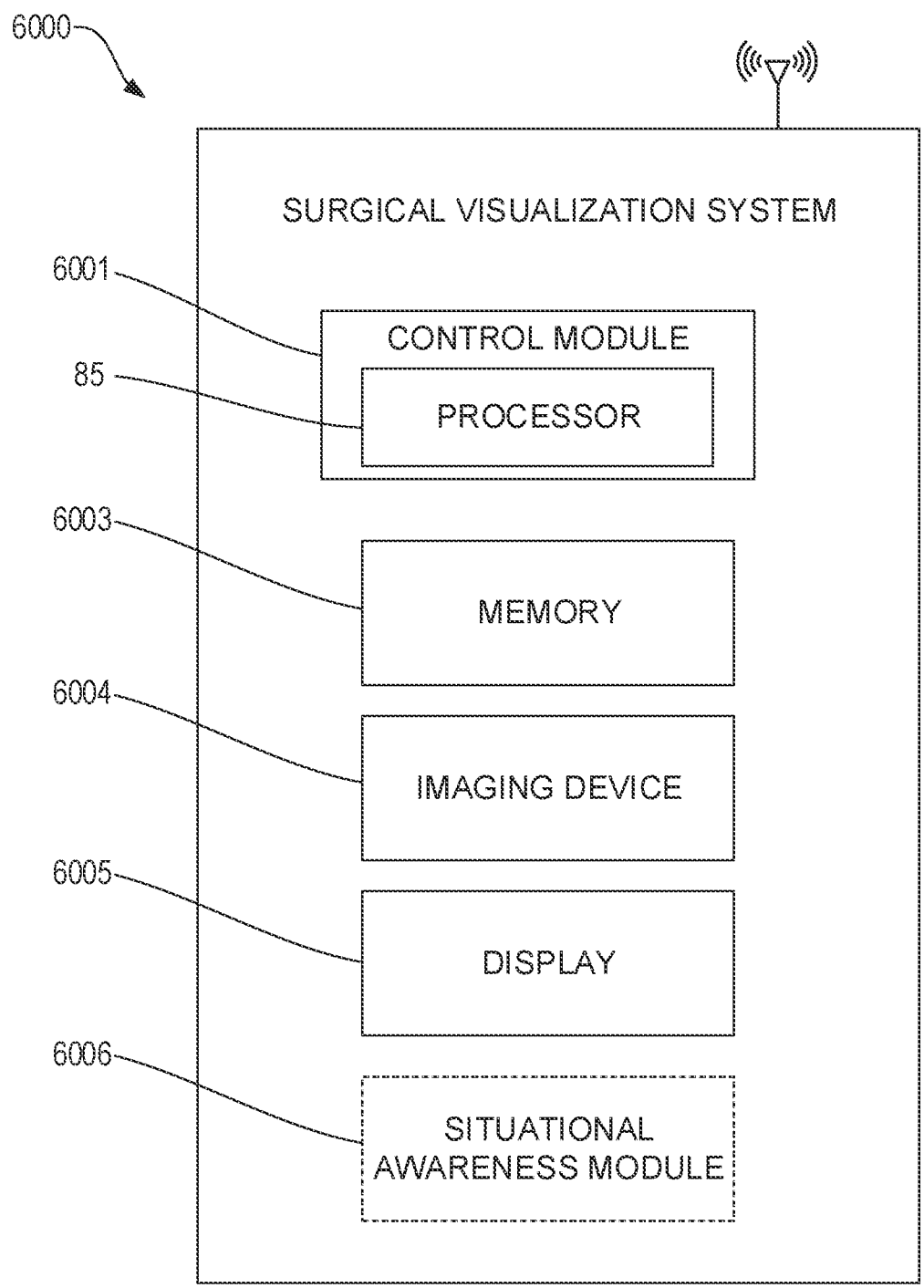
FIG. 12 illustrates a surgical visualization system, in accordance with at least one aspect of this disclosure.

FIG. 12 illustrates a surgical visualization system 6000, in accordance with at least one aspect of this disclosure. Various components of the surgical visualization system 6000 are similar in many respect to components of other systems described elsewhere in the present disclosure and, as such, are not repeated herein at the same level of detail for brevity. The surgical visualization system 6000 includes a control module 6001 configured to perform various techniques described herein, for example, by using one or more processors or processing circuitry such as the processor 85. In some implementations, the system 6000 can include, be used in conjunction with, or be communication with the augmented reality device 85, for example. The system 6000 may further include storage medium such as, for example, a memory 6003, an imaging device 6004 such as, for example, the camera 88, and a display 6005. The system 6000 may further include one or more speakers 91, haptic controllers 92, and/or sensors 90 (see FIG. 10). The display 6005 can include, for example, the AR display 89, a VR display, a projector, a heads-up display, a screen, and/or any other suitable device for portraying visual content.

In some implementations, the system 6000 is incorporated into the computer-implemented interactive surgical system 50, for example. In some implementations the system 6000 is in operable communication with one or more hubs, systems, networks, servers, and/or databases that can deliver surgical data to the system 6000. For example, the system 6000 can be in operable communication with cloud 54 that may include a remote server 63, robot hub 72, surgical hub 56, devices/instruments 21, and/or modular control tower 23 via wired or wireless communication standards or protocols, as described herein. In some implementations, the system 6000 includes a situational awareness module 6006 similar to that described in connection was the surgical hub 5104. The situational awareness module 6006 can be trained to extrapolate contextual information about a surgical procedure based on a multitude of perioperative data received through sensor input and/or user input.

In view of the foregoing problems associated with competing amounts of overlaid information, the present disclosure provides a control system that can control and/or limit the amount of data that is being overlaid on the display. In some aspects the system 6000, can monitor and/or control an amount of information that is being overlaid on a display, such as display 6005, such that the amount of overlaid information does not cause strain or overwhelm the surgical staff. In various embodiments, the system 6000 can control the amount of overlaid information by comparing the overlaid information to a distraction threshold. The distraction threshold can be a user defined threshold, a predefined threshold stored in a memory, such as memory 6003, a threshold based on the size of the display, or combinations thereof.

In some aspects, the distraction threshold can be based on the size of the display such that the distraction threshold of one display is different than a distraction threshold of a second display that is larger than the first display. In some embodiments, the distraction threshold can be based on a combination of user provided inputs at an input interface and predefined inputs stored in the memory 6003. In one aspect, the distraction threshold can be defined as a threshold amount of information that can cause a user to become overwhelmed with the amount of information overlaid on the display. In several embodiments, the distraction threshold can vary from user to user according to, among other things, a user's experience, a user's age, a user's eye sight, a user's comfort level, or combinations thereof.

In some embodiments, the distraction threshold can be defined as a percentage of the viewable area of the display, such as the screen of a monitor or the lens of a wearable device, like AR device 66, as examples. For example, the system 6000 can calculate a size of the viewable area of the display and set the distraction threshold as a percentage of the calculated area. In some example embodiments, the distraction threshold can be 10% of the calculated area, 25% of the calculated area, 50% of the calculated area, or 75% of the calculated area, as examples. In some embodiments, the percentage of the calculated area to be used as the distraction threshold can be user provided by the user via an input interface (such as at a keyboard of a computer), stored in the memory 6003, based on standard industry practices, based on an experience level of the user, or combinations thereof.

In various embodiments, the system 6000 can monitor the area occupied by overlaid information and adjust the amount of overlaid information when the total area occupied by overlaid information reaches or exceeds the distraction threshold. In some aspects, the system 6000 can receive a signal from a sensor that causes information to be overlaid on the display. The system 6000 can determine the area that the overlaid information will occupy on the display prior to overlaying the information thereon. In some aspects, the area the overlaid information will occupy is predefined and stored in the memory 6003. In some aspects, the area the overlaid information will occupy is variable and will vary based on available space on the display. In some aspects, the area the overlaid information will occupy is based on a user provided input. In some example embodiments, a user can provide inputs to the system 6000 providing sizes of certain types of information to overlay on the display. Once the system 6000 determines the area that the overlaid information will occupy on the display, the system 6000 can evaluate whether or not to overlay the information on the display, as explained in more detail below.

In various embodiments, the system 6000 can track the total area occupied, or to be occupied, by the overlaid information on the display and compare the tracked area to the distraction threshold. In one example embodiment, the system 6000 can evaluate the display and determine that a first amount of information is currently overlaid on the display. The system can evaluate the first amount of information and determine that the first amount of information occupies a total area that is less than the distraction threshold. The system can then receive a signal from, as an example, an EKG that is indicative of a patient's heart rate. The system 6000 can determine the area of the display that will be occupied by the overlaid heart rate information based on, for example, a predefined area stored in the memory 6003. The system 6000 can then add the determined area to be occupied by the overlaid heart rate information to the total area already overlaid on the display. If the combined area is less than the distraction threshold, the system 6000 can overlay the heart rate information onto the display with no adjustment to the already overlaid information. If the combined area reaches or exceeds the distraction threshold, the system 6000 can take a positive action such that the overlaid information on the display does not exceed the distraction threshold, as discussed in more detail below.

In some aspects, the system 6000 can determine whether adding new overlaid information to the display will cause the distraction threshold to be reached or exceeded prior to overlaying the new overlaid information. By determining whether or not the distraction threshold is reached or exceeded prior to overlaying the new information, the system 6000 can prevent the display from overwhelming the OR personnel viewing the display, even if only momentarily. In the event the system 6000 determines that adding new overlaid information will not cause the amount of information to reach or exceed the distraction threshold, the system 6000 can proceed with overlaying the new information knowing that the distraction threshold will not be reached or exceeded. In the event the system 6000 determines that overlaying new information will cause the amount of information on the display to reach or exceed the distraction threshold, the system 6000 can take a positive action prior to overlaying the new information, such as removing overlaid information from the display, adjusting the overlaid information already on the display (such as by changing the size, as an example), among many other positive actions, as will be described in more detail herein below. By taking a positive action prior to overlaying the information, the system 6000 ensures that the distraction threshold isn't reached or exceeded on the display, even if only momentarily.

In some aspects, the system 6000 can take a positive action to reduce, control, or maintain the amount of information overlaid on the display such that the overlaid information does not reach or exceed the distraction threshold. In various embodiments, a situational awareness module, such as situational awareness module 6006, can determine, based on various sensors, such as sensor 90, imaging modules, such as imaging device 6004, or inputs, as described elsewhere herein, steps of the surgical procedure that have recently been completed, steps that are currently being performed, or steps that are soon to be completed, as examples, and prioritize and remove overlaid information according to these determined steps In one aspect, the system 6000 can prioritize the information overlaid, or to be overlaid, and remove information that is deemed less relevant or important. In some aspects, information can be deemed less relevant, or irrelevant, when little to no information regarding a surgical step is being received by the situation awareness module 6006. In some aspects, information can be deemed more relevant or important when the situational awareness module is actively receiving updated data associated with the information to be overlaid. In some aspects, priority of information can be stored in a memory, such as memory 6003. In some aspects, priority can be based on industry standards, user preference, user experience, the type of surgical procedure being performed, or combinations thereof.

In one example embodiment, the system 6000 can receive data from an RF or ultrasonic generator indicating that an energy instrument is being fired. The situational awareness module 6006 can infer that the surgeon is in the process of dissecting patient tissue utilizing the energy instrument and, therefore, prioritize overlaying information associated with this step of the surgical procedure, such as measured impedance of the tissue, measured temperature of the tissue, measured energy output by the generator, as examples. In the event the amount of overlaid information reaches or exceeds the distraction threshold, the system 6000 can remove, or adjust, overlaid information that is deemed less relevant to the determined step of the surgical procedure currently being performed. In the above-reference embodiment, the situational awareness module 6006 can identify that no inputs indicative of a surgical stapling operation are currently being received, and therefore, information regarding surgical stapling steps can be removed from the display. In some aspects, the system 6000 can receive information that the situational awareness module 6006 deems irrelevant to the current step of the surgical procedure, and therefore, the system 6000 can choose to not overlay this information on the display. In one example embodiment, a surgeon can be performing a surgical stapling operation on patient tissue. During the stapling operation, the system 6000 can detect, via a temperature sensor, a change in the temperature level of the tissue. The system 6000 can determine that the change in temperature is less relevant, or irrelevant, to the surgical stapling procedure and therefore, cannot overlay this information on the display.

In various embodiments, when the system 6000 determines that overlaid information is to be removed from the display, or the system 6000 deems information irrelevant, or less relevant, to overlay on the display, the system 6000 can overlay the information onto a secondary display such that the information is still visible to the surgical staff. In one aspect, the OR can have primary display where the most relevant information is displayed and a secondary display where secondary information is displayed. Removed and/or less relevant information can removed from the primary display and overlaid onto the secondary display such that this information is still available, if necessary. In some example embodiments, the surgical staff can determine that information on the secondary display is more relevant than determined by the system. Accordingly, the surgical staff can provide an input to the system, such as at an input interface, like a keyboard, that shifts the information from the secondary display to the primary display. Similarly, the surgical staff can determine that information on the primary display is less relevant than determined by the system. Accordingly, the surgical staff can provide an input to the system, such as at an input interface, that shifts the information from the primary display to the secondary display. This provides the surgical staff with the ability to manually shift priorities of information in real-time during the surgical procedure.

In one aspect, the system 6000 can adjust the amount of information overlaid based on user provided inputs. For example, a user can provide inputs to the system 6000 that can be used when determining what information to overlay and what information to remove. In one example embodiment, the user can assign priority levels to types of information prior to, or during, a surgical procedure that the system 6000 can then use when determining what information to remove or adjust. In one example embodiment, the system 6000 can assign priority levels to overlaid information based on predefined parameters associated with the user, such as the user's experience level, the user's age, the user's eye sight, the user's preferences, as examples. In another example embodiment, the user can provide inputs to the system 6000 instructing the system which information to never to overlay, or only overlay in certain scenarios, as determined by the situational awareness module. In another example embodiment, the user can provide inputs to the system 6000 instructing the system which information to always overlay, regardless of the scenario. As one example, a user can instruct the system to always overlay the patient's heart rate. In such embodiments, even if the patient's heart rate is determined to be less relevant for the current surgical step, the information will not be removed from the display. In other such embodiments, if the patient's heart rate is determined to be less relevant by the system 6000, but the user instructs that the heart rate information remain overlaid, the system can, instead, change a size of the heart rate overlay, or change a position on the display of the heart rate overlay, as explained in more detail herein below.

In some aspects, the system 6000 can adjust overlaid information in combination with, or in the alternative to, removing overlaid information from the display. In some embodiments, the system 6000 can adjust a size of a portion of the overlaid information on the display. In one aspect, the system 6000 can increase a size of relevant information, such as information deemed relevant by the situational awareness module, user provided inputs, predefined inputs, or combinations thereof. Increasing the size of the information can include increasing the total area occupied by the overlaid information on the display or increasing the font size of the overlaid information, as examples. In one aspect, the system can decrease a size of information that is deemed less relevant, such as information deemed less relevant by the situational awareness module, user provided inputs, predefined inputs, or combinations thereof. Decreasing the size of the information can include decreasing the total area occupied by the overlaid information on the display or decreasing the font size of the overlaid information, as examples. In some embodiments, the system 6000 can adjust a weight of a portion of the overlaid information on the display, such as by bolding or unbolding information based on their relevance.

In some embodiments, the system 6000 can adjust a position of a portion of the overlaid information on the display. In one aspect, the system 6000 can adjust the position by positioning more relevant or important information in a readily visible area of the display, such as near the center of the display, or near the area on the livestream where the surgeon is currently working, as examples. In one aspect, the system 6000 can adjust the position by positioning less relevant or less important information in a less-readily visible area of the display, such as on the corners or sides of the display, or an area away from where the surgeon is currently working in the livestream, as examples.

In some example embodiments, when the system 6000 is determining which overlaid information to remove such that the overlaid information remains below the distraction threshold, the system 6000 can consider adjustments already made to overlaid information when determining what information to remove. In one example embodiment, the system 6000 can receive a signal indicative of new information to overlay on the display. The system 6000 can determine that the new information is relevant (according to a determination from the surgical awareness module) and overlaying the same will cause the distraction threshold to be reached or exceeded, and therefore, the system 6000 needs to remove or adjust information on the display to accommodate the new relevant information. When assigning priority or relevancy levels to information already overlaid (such as based on user input or the determined step of the surgical procedure being performed, as example), the system 6000 can evaluate whether certain portions of the overlaid information have already been adjusted. In one example embodiment, that system 6000 can determine that the overlaid patient's heart rate information has already been reduced in size and repositioned to a corner of the display. In some embodiments, the system 6000 can determine that the patient's heart rate, having already been lowered in priority (having been already twice adjusted), can be removed from the display. In some other embodiments, the system 6000 can determine that the patient's heart rate has already been adjusted twice, and therefore, the system 6000 should evaluate whether other information on the display can be adjusted before deciding to remove the patient's heart rate information.

In some aspects, the system 6000 can assign an amount to which information can be adjusted before being removed from the display. In various embodiments, a user can assign degrees of adjustment that can done before information is removed from the display. In one example embodiment, a user can instruct the system 6000 that information can be reduced in size until it occupies a lower threshold area of the display, such as 10% of the display. Once the system 6000 determines that the information needs to be reduced in size such that it occupies less than the threshold area of the display, such as 5% of the display, the system 6000 can instead remove the information. The above-provided degrees of adjustment allow the system 6000 to confidently remove information from the display such that portions of the display are not occupied by information only occupying small amount of the display.

In some embodiments, the system 6000 can provide auditory feedback to a surgeon or members of the OR while completing a task rather than overlaying information, or constantly adjusting overlaid information, on the display. In one aspect, for a tissue manipulation task, rather than having a visual on the display, the system 6000 can provide an auditory signal as feedback to minimize distractions on the display. In one example embodiment, the task can be to navigate tissue and/or a surgical instrument to a target location. The target location can be provided on the display. The system 6000, using the imaging device 6004, position sensors, accelerometers, a visualization system, any number of position tracking systems provided by the present disclosure, or combinations thereof, can be used to track the location of the tissue and/or the surgical instrument and provide an auditory tone as the task is being completed (i.e., as the tissue and/or surgical instrument is navigated to the target area). In various embodiments, the visualization system can be similar to visualization systems described in U.S. Pat. No. 11,000,270, U.S. Patent Application Publication No. 2020/0015900, U.S. Patent Application Publication No. 2020/0015899, U.S. Pat. No. 11,259,793, U.S. Patent Application Publication No. 2020/0015924, U.S. Patent Application Publication No. 2020/0015898, U.S. Patent Application Publication No. 2020/0015906, U.S. Patent Application Publication No. 2020/0015907, U.S. Pat. No. 10,925,598, U.S. Patent Application Publication No. 2020/0015914, and U.S. Patent Application Publication No. 2020/0015902, which are hereby incorporated by reference in their entireties herein.

In one example embodiment, the auditory feedback module can increase a volume, a speed, or a combination thereof, as the target area is being approach by the tissue and/or surgical instrument. In another example embodiment, the auditory feedback module can decrease a volume, a speed, or a combination thereof, as the tissue and/or surgical instrument is moved away from the target area. In another example embodiment, the auditory feedback module can provide an auditory tone that informs the surgeon that the target area is being completed. In another example embodiment, the auditory feedback module can provide an auditory signal indicative of the task being completed. In one aspect, the system 6000 can provide the auditory tones, via the auditory feedback module, without adjusting the overlaid information on the display, so as to minimize distractions thereon while completing the task.

By providing auditory tones in lieu of constantly updating information on the display, additional value is provided to the OR staff as the staff that is not focused on the display that the surgeon was looking at could provide indication that they completed the job and they need to be ready for the next step. For example, for a task involving stapling tissue, an auditory tone indicating that the stapler has been fired can notify the nurse that the surgical stapler is ready to handoff and to be replaced with a new staple cartridge for the next staple firing. This can eliminate the need for the surgeon to ask for the reload and keep focus on the surgical site.

As referenced above, the system 6000 can adjust or control the amount of information on the display based on, among other things, an experience level of the user. In one aspect, a user can provide their experience level to the system via an input interface and the system can retrieve parameters associated with the information to overlay according to the provided input. In one example embodiment, the user can provide a numerical input to the system that corresponds to their experience level (i.e., an input of '1' corresponds to a surgeon with 5+ years of experience, an input of '2' corresponds to a surgical resident, an input of '3' corresponds to a medical student, as examples). In other example embodiments, the user can manually enter their years of experience. In other example embodiments, the user can enter their level of education. In other example embodiments, the user can enter the number of times in which they've performed the particular surgical procedure. In other example embodiments, the user can provide a confidence level associated with the particular surgical procedure. Based on the provided input, the system 6000 can retrieve, from the memory 6003, predefined parameters associated with the provided experience. In some aspects, the predefined parameters can include a distraction threshold, as explained elsewhere herein, to be used during a surgical procedure. In one example embodiment, a surgeon with several years of experience can have a higher distraction threshold than compared to a medical student, who requires may more information, but also requires less distractions to maintain their focus. In other aspects, the predefined parameters can include types of data to overlay during the course of a surgical procedure. In one example embodiment, for a less experienced user, the information to be overlaid could indicate anatomy overlays, warnings, steps for use of each step of the surgical procedure, confirmation that steps were completed, contradictions to expected results or steps of the surgical procedure, as examples. In another example embodiment, a more experienced user may not require certain overlays, such as anatomical overlays, warnings, confirmation that steps were completed, as examples, and therefore, these overlays will not be provided.

In various embodiments, the system 6000 can control what information is being overlaid based on surgical devices that are actively being used by the surgeon or the staff. In some aspects, the system 6000 can determine what surgical devices are actively being used based on data received from sensors and modules within the OR. In one example embodiment, the system can determine an energy device is actively being used based on data received from the generator module 40. In one example embodiment, the system can determine a vacuum module is actively being used based on data received from the smoke evacuation module 26. In one example embodiment, the system can determine a suction or irrigation module is actively being used based on data received from the suction/irrigation module 28. In one example embodiment, the system can determine a surgical device is actively being used based on data received from the sensor module 29. In one example embodiment, the system can determine a surgical device is actively being used based on data received from an imaging module 25. In one example embodiment, the system can determine a surgical device is actively being used based on inferences made from the situational awareness module. In one example embodiment, the system can determine that a device is actively being used based on the system receiving a signal indicative of a pairing occurring between a user-worn identifier and a surgical instrument, as explained in U.S. Pat. No. 10,758, 310, which is hereby incorporated by reference in its entirety herein. In various embodiments, the system 6000 can determine what surgical devices are being actively used based on various sensors, modules, and input devices described herein, alone or in combination with each other. Once the system 6000 has determined what surgical devices are actively being used, the system 6000 can prioritize information associated with these surgical devices when deciding what information to overlay on the display. In one aspect, when the system 6000 determines a surgical device 6000 is actively being used, the surgical system can assign a higher priority level to information associated with the actively used surgical device when compared to information associated with other surgical devices that are not actively being used.

In various embodiments, the system 6000 can evaluate, determine, and control what information is overlaid on the display based on a series of predetermined conditions, user provided conditions, or conditions stored in a memory. In one aspect, when determining what information should be overlaid, the system 6000 can analyze inputs from various modules, sensors, and user input devices and determine what information to overlay based on what information would be useful to the surgeon, what condition or states of operation would the surgeon want to track, and what surgical jobs require conformation in the surgeon's mind that are worth tracking, among others. In one example embodiment, after the completion of a staple firing stroke with a surgical stapling device, the system 6000 can determined, based on the series of predetermined conditions, user provided conditions, and/or conditions stored in a memory, that the surgeon would want to inspect the staple line to ensure that the stapling stroke with successful. At this point, the display could zoom into the completed staple line to give the surgeon an optimal view, gray out or minimize everything else, or provide any necessary overlays to determine if the staple firing stroke was successful. With these predefined conditions, the system 6000 can determine that the focus at the present time should be on the task that was completed, therefore prioritizing information associated with the completion of this task and deprioritizing information irrelevant to the present task. The above-provided example could drive priority to the center of the display to ensure that no relevant information associate with the task is overlooked or missed by the surgeon.

In various embodiments, the system 6000 can assign priority on what information to overlay and what overlaid information to adjust or remove based on tasks associated with the surgical procedure being completed. In one example embodiment, the system 6000 can provide an overlay to confirm that a reload has been installed correctly, such a replacement surgical staple cartridge being reloaded into a surgical stapler. In another example embodiment, the system 6000 can provide an overlay indicating that a knife in a cutting instrument has reached its intended position, such as the end of stroke position, the beginning on stroke position, a middle of the stroke position, or any number or positions along the cutting path. In various embodiments, when the system 6000 determines that a tissue cutting step is to be accomplished (by way of inputs from any number of sensors, modules, user input interfaces, or by way of the situational awareness module, as examples), the system 6000 can overlay a trajectory of the intended staple line position to ensure that the staple line is captured between the jaws of the surgical cutting instrument. In various embodiments, the system 6000 can determine that tissue is being grasped by a surgical device and overlay a determined tissue thickness for a clinician's reference. In addition, the system 6000 can determine that a surgical stapling procedure is to be performed on the captured tissue (by way a user input or a situational awareness module, as examples) and overlay the appropriate staple reload to be used to staple the captured tissue.

In various embodiments, the system 6000 can assign priority on what information to overlay and what overlaid information to adjust or remove based on the criticality of the step of the surgical procedure being completed. In one example embodiment, when the system 6000 determines that tissue is being manipulated by a surgical device, the system 6000 can determine that it is critical to monitor the amount of force being applied to the tissue to ensure that the tissue isn't damaged. Accordingly, the system 6000 can drive priority toward overlaying information relating to the amount of force being applied to the tissue, which can be measured, by example, using a force sensor within the jaws of the tissue manipulator. In one example embodiment, when the system 6000 determines that tissue is being cut and stapled by a surgical stapling device, the system 6000 can determine that it is critical to overlay multiple pieces of information on the display, such as the position of the jaws, the thickness of the tissue, the pressure being applied to the tissue, a clock to ensure a sufficient amount of time was allowed for fluids to egress out of the clamped tissue being firing the surgical stapler, the firing force applied by the surgical staple, and/or the flow of tissue, as examples. The criticality of parameters associated with certain tasks of a surgical procedure can be predetermined, vary from user to user, such as based on experience level, preference, etc., or a combination thereof.

Figure 13:
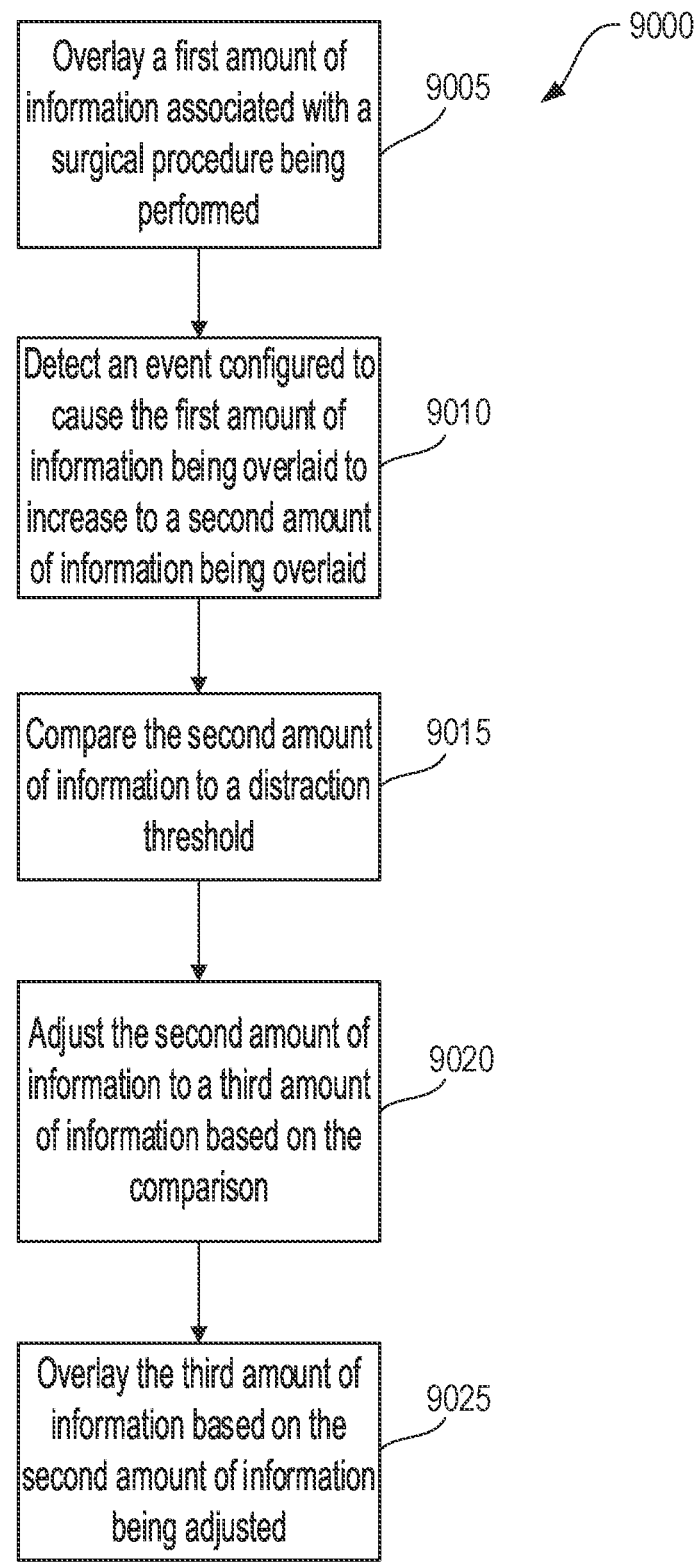
FIG. 13 illustrates a method for determining a display arrangement of surgical data competing for presentation onto a display that is showing a livestream of a surgical field, in accordance with at least one aspect of this disclosure.

FIG. 13 illustrates a flowchart showing operations of an example method 9000 for determining a display arrangement of surgical data competing for presentation onto a display, such as the display 6005, that is showing a livestream of a surgical field. In one aspect, the livestream can be captured by an imaging device, such as imaging device 6004, that is imaging a surgical field. The imaging device can be operably coupled to a control system, such as system 6000, which is also operably coupled to the display. The control system can transmit the livestream of the surgical field from the imaging device to the display such that surgical personnel can view the livestream on the display.

In various embodiments, the method 9000 includes overlaying 9005, on the livestream, a first amount of information associated with the surgical procedure being performed. In one aspect, the control system can receive inputs from various modules, sensors, user input devices, a situational awareness module, as examples, and overlay information associated with these inputs on the display.

In various embodiments, the method 9000 further includes detecting 9010 an event configured to cause the first amount of information being overlaid to increase to a second amount of information being overlaid. In one example embodiment, the situational awareness module can determine that a surgical stapling step is about to occur, which would drive the control system to overlay information associated with the surgical stapling step. Various other events that would cause the amount of information overlaid on the display are described elsewhere herein.

In various embodiments, the method 9000 further includes comparing 9015 the second amount of information to a distraction threshold. In one aspect, as described elsewhere herein, the distraction threshold can be predetermined, user provided, vary from user to user, as examples. In one example embodiment, the control system can evaluate the amount of area that the second amount of information would occupy on the display and compare this to the distraction threshold to determine if the distraction threshold will be reached or exceeded. As one example, the control system can determine that the second amount of information will occupy 60% of the viewable area of the display and the distraction threshold is defined as 50% of the viewable area of the display.

In various embodiments, the method 9000 further includes adjusting 9020 the second amount of information to a third amount of information based on the comparison, wherein the third amount of information is less than the distraction threshold. Continuing from the above provided example embodiment, the control system can determine that the second amount of information will occupy 60% of the viewable area of the display, which is greater than the 50% distraction threshold. Accordingly, the control system can adjust the overlaid information to ensure that the distraction threshold is not reached or exceeded. In one example embodiment, the control system can evaluate the information currently overlaid on the display and remove information that is determined to be irrelevant, or less relevant, based predetermined conditions, user provided conditions, or combinations thereof. In another example embodiment, the control system can evaluate the information currently overlaid on the display and adjust the information that is determined to be irrelevant, or less relevant, based predetermined conditions, user provided conditions, or combinations thereof. This adjustment could be changing a size thereof, a weight thereof, a position thereof, or combinations thereof, as described in greater detail elsewhere herein. In another example embodiment, the control system can evaluate the information currently overlaid on the display and both remove and adjust information that is determined to be irrelevant, or less relevant, based predetermined conditions, user provided conditions, or combinations thereof.

In various embodiments, the method 9000 can further include overlaying 9025, on the livestream, the third amount of information based on the second amount of information being adjusted. In one aspect, once the control system has determined an adjust to be made that will cause the overlaid information to not reach or exceed the distraction threshold, the control system can then adjust the overlaid information according to the determined adjustment. Continuing from the above-provided example embodiment where the second amount of overlaid information was to be 60% of the display, the control system can adjust the projected overlaid information such that only 45% of the display will be occupied by overlaid information, which is less than the 50% distraction threshold.

Figure 14:
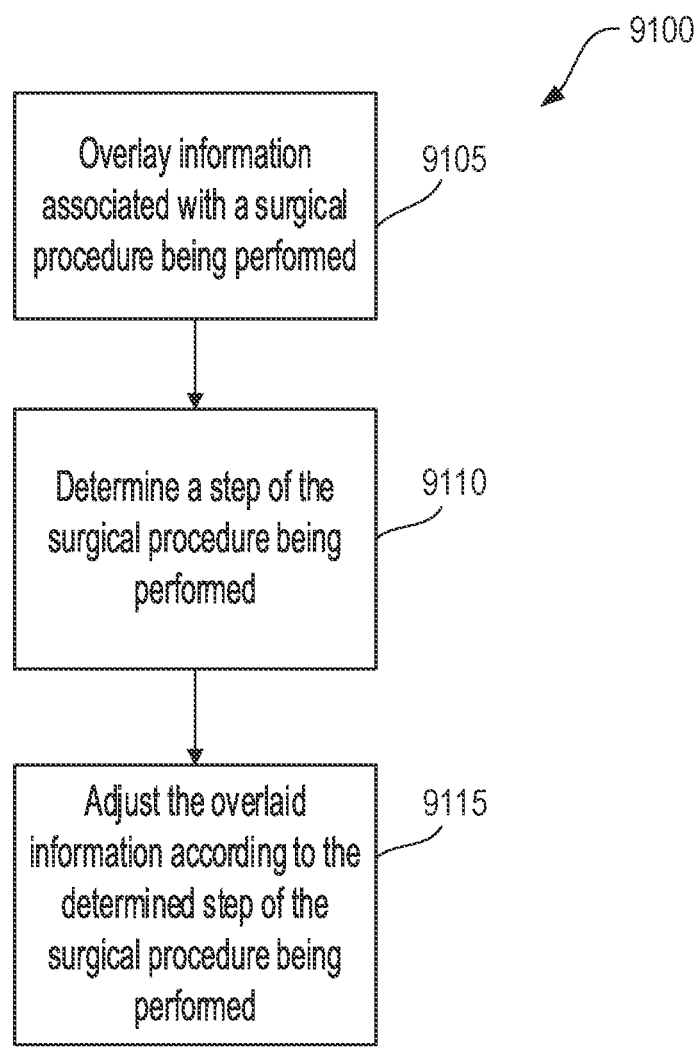
FIG. 14 illustrates a method for determining a display arrangement of surgical data competing for presentation onto a display that is showing a livestream of a surgical field, in accordance with at least one aspect of this disclosure.

FIG. 14 illustrates a flowchart showing operations of an example method 9100 for determining a display arrangement of surgical data competing for presentation onto a display, such as the display 6005, that is showing a livestream of a surgical field. In one aspect, the livestream can be captured by an imaging device, such as imaging device 6004, that is imaging a surgical field. The imaging device can be operably coupled to a control system, such as system 6000, which is also operably coupled to the display. The control system can transmit the livestream of the surgical field from the imaging device to the display such that surgical personnel can view the livestream on the display.

In various embodiments, the method 9100 includes overlaying 9105, on the livestream, a first amount of information associated with the surgical procedure being performed. In one aspect, the control system can receive inputs from various modules, sensors, user input devices, a situational awareness module, as examples, and overlay information associated with these inputs on the display.

In various embodiments, the method 9100 further includes determining 9110 a step of a surgical procedure being performed. In one aspect, the step of the surgical procedure can be determined by any number of inputs provided to a situational awareness module, such as data received from any number of sensors, modules, user inputs, or combinations thereof. Other examples for determining steps associated with a surgical procedure being performed as described elsewhere herein.

In various embodiments, the method 9100 further includes adjusting 9115 the overlaid information according to the determined step of the surgical procedure being performed. In one aspect, the control system can adjust a portion of the information currently overlaid on the display to assist the surgical personnel in completing the surgical task. In one example embodiment, the situational awareness module can determine that a tissue manipulation step is being performed on tissue, and therefore, the control system can adjust portions of the overlaid information that are relevant or irrelevant to the tissue manipulation step.

In one example embodiment, the control system can adjust the overlaid information by adjusting positions of the overlaid information on the display (i.e., moving overlaid information toward the center of the display, toward the edges of the display, toward or away from the spot in which the current step of the surgical procedure is being performed, as examples). In one example embodiment where tissue manipulation is occurring, overlaid information associated with force applied to the tissue can be moved toward the center of the display while information associated with tissue stapling operations can be moved to the edge of the display.

In one example embodiment, the control system can adjust the overlaid information by adjusting a size of the overlaid information on the display (i.e., increasing a front size of the information, decreasing a font size of the information, increasing the total area occupied on the display by the information, or decreasing a total area occupied on the display by the information, as examples). In one example embodiment where tissue manipulation is occurring, overlaid information associated with force applied to the tissue can increase from occupying 10% of the viewable area of the display to 20% of the viewable area of the display while information associated with tissue stapling operations can be decreased from occupying 20% of the viewable area of the display to 10% of the viewable area of the display.

In one example embodiment, the control system can adjust the overlaid information by adjusting a weight of the overlaid information on the display (i.e., bolding or unbolding information, as examples). In one example embodiment where tissue manipulation is occurring, overlaid information associated with force applied to the tissue can be bolded while information associated with tissue stapling operations can be unbolded.

In one example embodiment, the control system can adjust the overlaid information by adding or removing overlaid information on the display. In one example embodiment where tissue manipulation is occurring, the control system can detect that nothing is being overlaid on the display regarding pressure applied to the clamped tissue (determined, for example, by a force sensor in the jaws of the tissue manipulator). The control system can adjust the display to overlay information regarding the force applied to tissue, while also removing information relating to a tissue stapling operation.

In one aspect, the above-described adjustments can be made while also considering a distraction threshold. For example, the system 6000 can determine what kinds of adjustments to be made based on both the determined step of the surgical procedure and the distraction threshold such that the distraction threshold is not reached or exceeded. In the event that an adjust will cause the distraction threshold to be reached or exceeded, the system can take an alternative adjustment. In one example embodiment, the control system can determine that adding information relevant to the surgical procedure will cause the distraction threshold to be reached or exceeds, and therefore, the control system can cause information less relevant to be decreased in size or removed from the display so as to avoid exceeding the distraction threshold. Any variety or combination of adjustments described herein above can be made such that relevant information is provided to the user without exceeding a distraction threshold, thus overwhelming the user with information.

Figure 15:
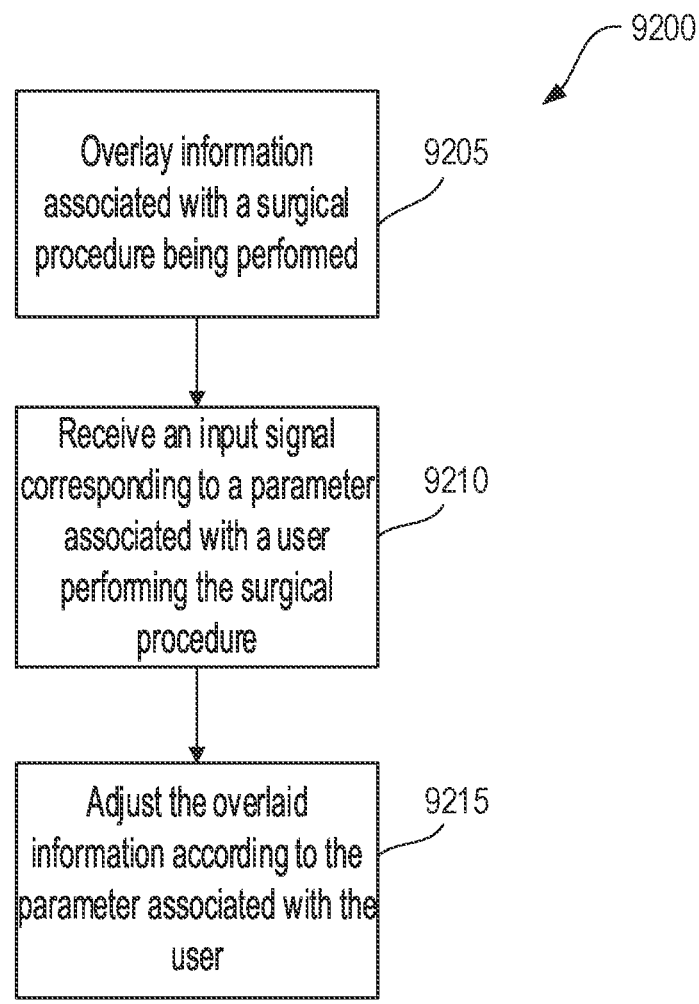
FIG. 15 illustrates a method for determining a display arrangement of surgical data competing for presentation onto a display that is showing a livestream of a surgical field, in accordance with at least one aspect of this disclosure.

FIG. 15 illustrates a flowchart showing operations of an example method 9200 for determining a display arrangement of surgical data competing for presentation onto a display, such as the display 6005, that is showing a livestream of a surgical field. In one aspect, the livestream can be captured by an imaging device, such as imaging device 6004, that is imaging a surgical field. The imaging device can be operably coupled to a control system, such as system 6000, which is also operably coupled to the display. The control system can transmit the livestream of the surgical field from the imaging device to the display such that surgical personnel can view the livestream on the display.

In various embodiments, the method 9200 includes overlaying 9205, on the livestream, information associated with the surgical procedure being performed. In one aspect, the control system can receive inputs from various modules, sensors, user input devices, a situational awareness module, as examples, and overlay information associated with these inputs on the display. Other examples for determining steps associated with a surgical procedure being performed as described elsewhere herein. In various embodiments, the method 9200 can further includes receiving 9210 an input signal that corresponds to a parameter associated with a user performing the surgical procedure. In one aspect, a surgeon, prior to or during the surgical procedure, can provide an input to the control system, such as at a keyboard or a computer, an audible command, or combinations thereof. In one aspect, the input can correspond to the identify of the user, the user's experience level, the user's age, the use's eye sight, the user's preferences, or combinations thereof, as examples.

In various embodiments, the method 9200 can further includes adjusting 9215 the overlaid information according to the parameter associated with the user. In one aspect, the parameter associated with the user can be the user's experience level. In some embodiments, the user can manually enter their experience level. In one aspect, the experience level can include a number of years of experience, a comfort level with the procedure, a position within the hospital (surgeon, resident, intern, as examples), or combinations thereof. In some embodiments, the control system can adjust the overlaid information according to this experience level. In one example embodiment, a first user with a first level of experience can have a first amount of information overlaid on the display and a second user with a second level of experience can have a second amount of information that is different than the first amount of experience overlaid on the display. In another example embodiment, a first user with a first level of experience can have a first type of information overlaid on the display and a second user with a second level of experience cannot have the type of information overlaid on the display. In some embodiments, a first user with a first level of experience can have a first amount of information and a first type of information overlaid on the display and a second user with a second level of experience can have a second amount of information that is different than the first amount of experience, as well as not have the first type of information, overlaid on the display. The control system can adjust the overlaid information according to the experience level such that user's with less experience can have more information, or more focused information, overlaid on the display, whereas user's with more experience can have less information, or only certain types of information, overlaid on the display.

Although all types of information can be valuable to the surgical staff at some point of the surgical procedure, when everything is important nothing is important. The above-provided disclosure allows surgical staff to be presented with meaning, relevant information on a display without being overwhelmed with large sums of information that cause surgical personnel to become distracted or lose focus during a surgical procedure.

Various additional aspects of the subject matter described herein are set out in the following numbered examples:

Example 1: A surgical system comprising an imaging device, a display configured to show a livestream of a surgical field of a surgical procedure, wherein the livestream is captured by the imaging device, and a control system operably coupled to the imaging device and the display, wherein the control system is configured to overlay, on the livestream, a first amount of information associated with the surgical procedure, detect an event configured to cause the first amount of information being overlaid to increase to a second amount of information being overlaid, compare the second amount of information to a distraction threshold, adjust the second amount of information to a third amount of information based on the comparison, wherein the third amount of information is less than the distraction threshold, and overlay, on the livestream, the third amount of information based on the second amount of information being adjusted.

Example 2: The surgical system of Example 1, wherein the control system is configured to adjust the second amount of information to the third amount of information based on the second amount of information reaching or exceeding the distraction threshold.

Example 3: The surgical system of Examples 1 or 2, wherein the control system is further configured to overlay, on the livestream, the second amount of information based on the second amount of information being below the distraction threshold.

Example 4: The surgical system of any one of Examples 1-3, wherein the distraction threshold is based on a user input.

Example 5: The surgical system of any one of Examples 1-4, wherein the display comprises a viewable area, and wherein distraction threshold corresponds to a percentage of the viewable area.

Example 6: The surgical system of any one of Examples 1-5, further comprising a situational awareness module operably coupled to control system, wherein the control system is further configured to determine, by the situational awareness module, a step of the surgical procedure, and wherein adjusting the second amount of information to the third amount of information comprises removing information irrelevant to the step of surgical procedure being performed.

Example 7: A surgical system comprising an imaging device, a display configured to show a livestream of a surgical field of a surgical procedure, wherein the livestream is captured by the imaging device, a situational awareness module, and a control system operably coupled to the imaging device, the display, and the situational awareness module, wherein the control system is configured to overlay, on the livestream, information associated with the surgical procedure, determine, by the situational awareness module, a step of the surgical procedure, and adjust the overlaid information according to the determined step of the surgical procedure being performed.

Example 8: The surgical system of Example 7, wherein adjusting the overlaid information comprises adjusting a position of a portion of the overlaid information on the display.

Example 9: The surgical system of Examples 7 or 8, wherein adjusting the overlaid information comprises adjusting a size of a portion of the overlaid information on the display.

Example 10: The surgical system of any one of Examples 7-9, wherein adjusting the overlaid information comprises adjusting a weight of a portion of the overlaid information on the display.

Example 11: The surgical system of any one of Examples 7-10, wherein adjusting the overlaid information comprises removing overlaid information irrelevant to the step of the surgical procedure being performed.

Example 12: The surgical system of any one of Examples 7-11, wherein adjusting the overlaid information comprises overlaying additional information associated with the step of the surgical procedure being performed.

Example 13: The surgical system of any one of Examples 7-12, further comprising an auditory feedback module operably coupled to the control system, wherein the control system is further configured to determine, by the situational awareness module, a second step of the surgical procedure, overlay, on the livestream, information associated with the second step of the surgical procedure, and provide, by the auditory feedback module, an auditory tone based on the second step of the surgical procedure being completed, wherein the auditory tone is provided absent the overlaid information associated with the second step of the surgical procedure being adjusted.

Example 14: The surgical system of Example 13, wherein the second step of the surgical procedure comprises moving tissue from a first position to a second position, wherein the control system is further configured to provide, by the auditory feedback module, a second auditory tone as the tissue toward the second position.

Example 15: The surgical system of Example 14, wherein the control system is configured to increase a volume of the second auditory tone as the tissue approaches the second position.

Example 16: The surgical system of Examples 14 or 15, wherein the control system is configured to increase a speed of the second auditory tone as the tissue approaches the second position.

Example 17: A surgical system comprising an imaging device, a display configured to show a livestream of a surgical field of a surgical procedure, wherein the livestream is captured by the imaging device, and a control system operably coupled to the imaging device and the display, wherein the control system is configured to overlay, on the livestream, information associated with a surgical procedure, receive an input signal corresponding to a parameter associated with a user performing the surgical procedure, and adjust the overlaid information according to the parameter associated with the user.

Example 18: The surgical system of Example 17, wherein the parameter comprises an experience level of the user.

Example 19: The surgical system of Example 18, wherein the experience level comprises a first experience level, wherein the control system overlays a first amount of information on the livestream, and a second experience level, wherein the control system overlays a second amount of information on the livestream, wherein the second amount of information is different than the first amount of information.

Example 20: The surgical system of Examples 18 or 19, wherein the experience level comprises a first experience level, wherein the control system overlays a first type of information on the livestream, and a second experience level, wherein the control system does not overlays the first type of information on the livestream.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of this disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a control circuit, a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

The terms "proximal" and "distal" are used herein with reference to a clinician manipulating the handle portion of the surgical instrument. The term "proximal" refers to the portion closest to the clinician and the term "distal" refers to the portion located away from the clinician. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A surgical system, comprising:
an imaging device;
a processor configured to:
   obtain a livestream of a surgical field of a surgical procedure, wherein the livestream is captured by the imaging device;
   overlay, on the livestream, a first amount of information associated with the surgical procedure;
   detect an event configured to cause the first amount of information being overlaid to increase to a second amount of information being overlaid;
   compare the second amount of information to a distraction threshold;
   adjust the second amount of information to a third amount of information based on the comparison, wherein the third amount of information is less than the distraction threshold; and
   overlay, on the livestream, the third amount of information based on the second amount of information being adjusted.

2. The surgical system of claim 1, wherein the processor is configured to adjust the second amount of information to the third amount of information based on the second amount of information reaching or exceeding the distraction threshold.

3. The surgical system of claim 1, wherein the processor is further configured to overlay, on the livestream, the second amount of information based on the second amount of information being below the distraction threshold.

4. The surgical system of claim 1, wherein the distraction threshold is based on a user input.

5. The surgical system of claim 1, wherein the processor is further configured to:
   send the livestream to a display, wherein the display comprises a viewable area, and
   wherein distraction threshold corresponds to a percentage of the viewable area.

6. The surgical system of claim 1, further comprising a situational awareness module operably coupled to the processor, wherein the processor is further configured to determine, by the situational awareness module, a step of the surgical procedure, and wherein adjusting the second amount of information to the third amount of information comprises removing information irrelevant to the step of surgical procedure being performed.

7. A surgical system, comprising:
an imaging device;
a situational awareness module; and
a processor operably coupled to the imaging device, and the situational awareness module, wherein the processor is configured to:
   obtain a livestream of a surgical field of a surgical procedure, wherein the livestream is captured by the imaging device;
   overlay, on the livestream, information associated with the surgical procedure;
   determine, by the situational awareness module, a step of the surgical procedure; and
   adjust the overlaid information according to the determined step of the surgical procedure, wherein adjusting the overlaid information comprises adjusting a position of a portion of the overlaid information on the livestream.

8. The surgical system of claim 7, wherein adjusting the overlaid information comprises adjusting a size of a portion of the overlaid information on the livestream.

9. The surgical system of claim 7, wherein adjusting the overlaid information comprises adjusting a weight of a portion of the overlaid information on the livestream.

10. The surgical system of claim 7, wherein adjusting the overlaid information comprises removing overlaid information irrelevant to the step of the surgical procedure.

11. The surgical system of claim 7, wherein adjusting the overlaid information comprises overlaying additional information associated with the step of the surgical procedure.

12. The surgical system of claim 7, further comprising an auditory feedback module operably coupled to the processor, wherein the processor is further configured to:
   determine, by the situational awareness module, a second step of the surgical procedure;
   overlay, on the livestream, information associated with the second step of the surgical procedure; and
   provide, by the auditory feedback module, an auditory tone based on the second step of the surgical procedure being completed, wherein the auditory tone is provided absent the overlaid information associated with the second step of the surgical procedure being adjusted.

13. The surgical system of claim 12, wherein the second step of the surgical procedure comprises moving tissue from a first position to a second position, wherein the processor is further configured to provide, by the auditory feedback module, a second auditory tone as the tissue toward the second position.

14. The surgical system of claim 13, wherein the processor is configured to increase a volume of the second auditory tone as the tissue approaches the second position.

15. The surgical system of claim 13, wherein the processor is configured to increase a speed of the second auditory tone as the tissue approaches the second position.

16. A method performed by a surgical system, the method comprising:
    obtaining a livestream of a surgical field of a surgical procedure, wherein the livestream is captured by an imaging device;
    overlaying, on the livestream, information associated with the surgical procedure;
    sending the livestream with the overlaid information for display;
    determining a step of the surgical procedure; and
    adjusting, based on the determined step of the surgical procedure, a position of a portion of the overlaid information on the livestream.

17. The method of claim 16, further comprising:
    adjusting, based on the determined step of the surgical procedure, a size of a portion of the overlaid information on the livestream.

18. The method of claim 16, further comprising:
    adjusting, based on the determined step of the surgical procedure, a weight of a portion of the overlaid information on the livestream.

19. The method of claim 16, further comprising:
    removing overlaid information irrelevant to the step of the surgical procedure.

20. The method of claim 16, further comprising:
    identifying additional information associated with the step of the surgical procedure; and
    overlaying the identified additional information associated with the step of the surgical procedure on the livestream.

* * * * *